(12) United States Patent
Chen et al.

(10) Patent No.: US 9,904,036 B1
(45) Date of Patent: Feb. 27, 2018

(54) OPTICAL IMAGING LENS

(71) Applicant: GENIUS ELECTRONIC OPTICAL CO., LTD., Taichung (TW)

(72) Inventors: Feng Chen, Xiamen (CN); Feng Li, Xiamen (CN); Zhenfeng Xie, Xiamen (CN)

(73) Assignee: Genius Electronic Optical (Xiamen) Co., Ltd., Xiamen (CN)

( * ) Notice: Subject to any disclaimer, the term of this patent is extended or adjusted under 35 U.S.C. 154(b) by 0 days.

(21) Appl. No.: 15/288,924

(22) Filed: Oct. 7, 2016

(30) Foreign Application Priority Data

Aug. 26, 2016 (CN) .......................... 2016 1 0740873

(51) Int. Cl.
| | |
|---|---|
| G02B 13/00 | (2006.01) |
| G02B 9/62 | (2006.01) |
| G02B 5/00 | (2006.01) |
| G02B 5/20 | (2006.01) |
| G02B 27/00 | (2006.01) |

(52) U.S. Cl.
CPC .......... *G02B 13/0045* (2013.01); *G02B 5/005* (2013.01); *G02B 5/208* (2013.01); *G02B 9/62* (2013.01); *G02B 27/0025* (2013.01)

(58) Field of Classification Search
CPC ....... G02B 13/0045; G02B 9/62; G02B 13/04
USPC ................................. 359/682, 752, 756–762
See application file for complete search history.

(56) References Cited

U.S. PATENT DOCUMENTS

| | | | |
|---|---|---|---|
| 5,959,788 A * | 9/1999 | Yamakawa | .............. G02B 9/04 359/760 |
| 2016/0187620 A1* | 6/2016 | Huang | ............... G02B 13/0045 348/335 |

\* cited by examiner

*Primary Examiner* — Ricky Mack
*Assistant Examiner* — Kristina Deherrera
(74) *Attorney, Agent, or Firm* — Baker & McKenzie LLP

(57) ABSTRACT

Present embodiments provide for an optical imaging lens. The optical imaging lens includes a first lens element, a second lens element, a third lens element, a fourth lens element, a fifth lens element and a sixth lens element positioned in an order from an object side to an image side. Through controlling the convex or concave shape of the surfaces of the lens elements and designing parameters satisfying at least two inequalities, the optical imaging lens shows better optical characteristics, increases the effective focal length and narrows the angle of view while the total length of the optical imaging lens is shortened.

20 Claims, 31 Drawing Sheets

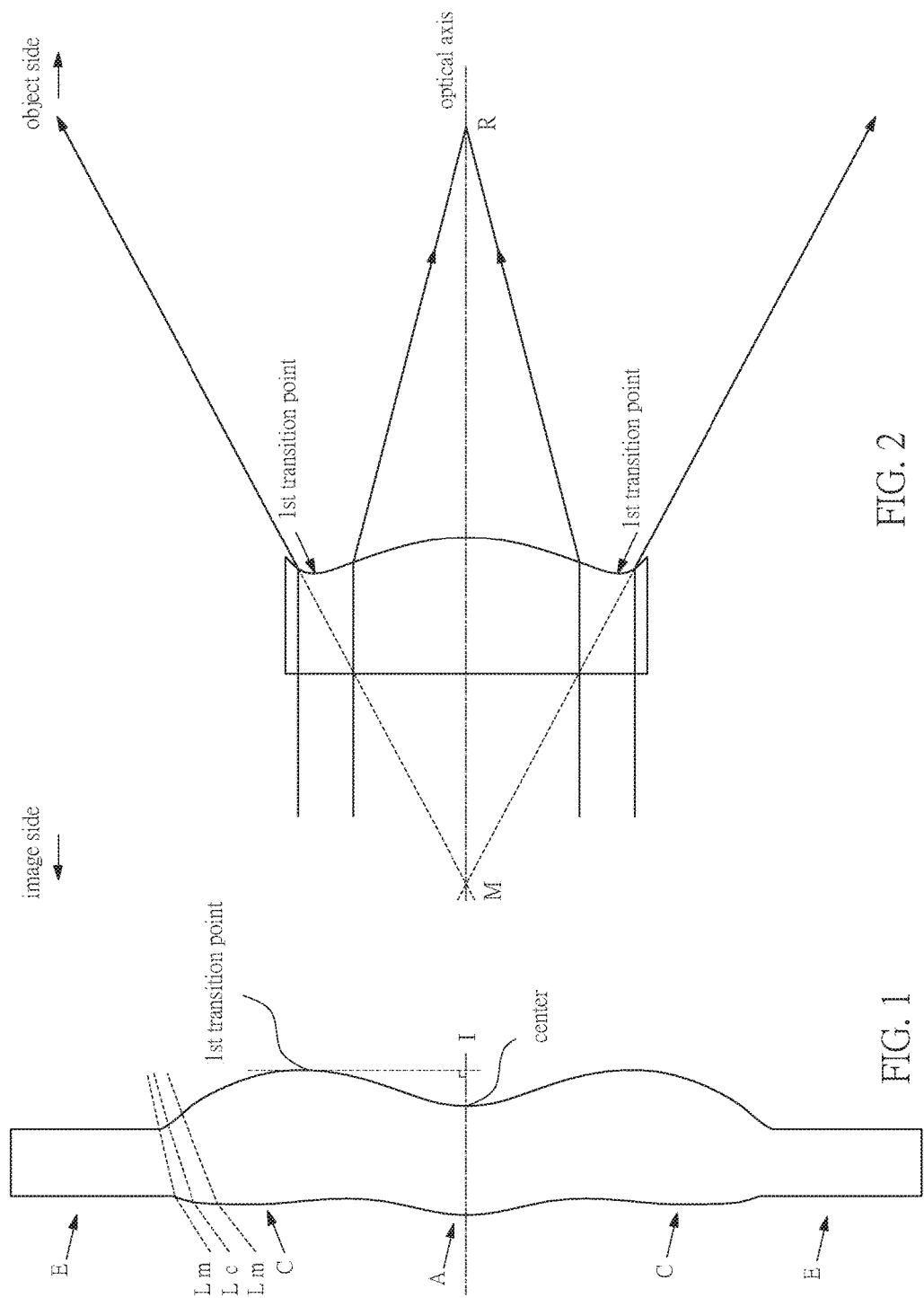

| \multicolumn{7}{c}{Effective focal length (EFL) = 5.828 mm, Half field of view (HFOV) = 24.051 deg., System length (TTL) = 5.397 mm, F-number (Fno) = 2.609, Image height = 2.619 mm} |

| Surface # |  | Radius (mm) | Thickness (mm) | Refractive index | Abbe number | Focus (mm) | Material |
|---|---|---|---|---|---|---|---|
| - | Object | ∞ | ∞ |  |  |  |  |
| 100 | Aperture stop | ∞ | -0.513 |  |  |  |  |
| 111 | 1st lens element | 1.470 | 0.763 | 1.545 | 55.987 | 2.946 | plastic |
| 112 |  | 13.935 | 0.037 |  |  |  |  |
| 121 | 2nd lens element | 5.880 | 0.238 | 1.661 | 20.412 | -7.114 | plastic |
| 122 |  | 2.584 | 0.227 |  |  |  |  |
| 131 | 3rd lens element | 4.228 | 0.281 | 1.545 | 55.987 | -32.514 | plastic |
| 132 |  | 3.335 | 0.415 |  |  |  |  |
| 141 | 4th lens element | -16.123 | 0.305 | 1.642 | 22.409 | -27.180 | plastic |
| 142 |  | -194.281 | 1.160 |  |  |  |  |
| 151 | 5th lens element | -7.928 | 0.306 | 1.545 | 55.987 | -5.694 | plastic |
| 152 |  | 5.189 | 0.032 |  |  |  |  |
| 161 | 6th lens element | 11.393 | 0.775 | 1.642 | 22.409 | 40.183 | plastic |
| 162 |  | 19.730 | 0.134 |  |  |  |  |
| 171 | IR cut filter | ∞ | 0.210 | 1.517 | 64.167 |  |  |
| 172 |  | ∞ | 0.515 |  |  |  |  |
| 180 | Image plane | ∞ | 0.000 |  |  |  |  |

FIG. 8

| Aspherical parameters | | | | | | |
|---|---|---|---|---|---|---|
| Surface # | 111 | 112 | 121 | 122 | 131 | 132 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | 3.905693E-03 | -6.686574E-02 | -1.766101E-01 | -1.372296E-01 | -7.462179E-02 | -8.020871E-02 |
| $a_6$ | 1.334093E-03 | 2.235171E-01 | 4.019080E-01 | 2.690794E-01 | 1.491500E-01 | 1.228707E-01 |
| $a_8$ | -2.511104E-03 | -1.762651E-01 | -3.171856E-01 | 2.933586E-02 | 2.719460E-01 | 3.782736E-01 |
| $a_{10}$ | 8.859574E-03 | 3.994487E-02 | 1.039513E-01 | -2.946529E-01 | -2.445064E-01 | -6.980361E-01 |
| $a_{12}$ | -4.167261E-03 | 9.715989E-04 | -2.795578E-02 | 4.566865E-01 | -4.594643E-01 | 4.531178E-01 |
| $a_{14}$ | 0.000000E+00 | 0.000000E+00 | 2.174200E-02 | -4.273181E-01 | 7.712479E-01 | -2.656332E-02 |
| $a_{16}$ | 0.000000E+00 | 0.000000E+00 | -6.502339E-03 | 1.880345E-01 | -3.431239E-01 | -7.669647E-02 |
| Surface # | 141 | 142 | 151 | 152 | 161 | 162 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -2.347746E-01 | -1.662693E-01 | -1.096295E-01 | -6.556314E-02 | -4.046881E-02 | -7.586079E-02 |
| $a_6$ | -6.489586E-02 | 6.475967E-02 | -1.938765E-02 | -2.440172E-02 | 1.898795E-02 | 3.118293E-02 |
| $a_8$ | 5.982638E-01 | 1.093736E-01 | 3.607454E-02 | 4.302236E-02 | -5.921309E-03 | -1.144003E-02 |
| $a_{10}$ | -1.190085E+00 | -1.226646E-01 | -6.240092E-03 | -2.523199E-02 | 4.677754E-04 | 3.503958E-03 |
| $a_{12}$ | 1.471087E+00 | 1.122597E-01 | -2.516571E-03 | 7.790896E-03 | -1.079086E-05 | -8.438417E-04 |
| $a_{14}$ | -9.648438E-01 | -8.095212E-02 | 1.029645E-03 | -1.272238E-03 | 2.143917E-05 | 1.156254E-04 |
| $a_{16}$ | 2.080289E-01 | 2.465370E-02 | -1.043630E-04 | 8.646622E-05 | -2.843202E-06 | -6.177065E-06 |

FIG. 9

| Effective focal length (EFL) = 5.924 mm, Half field of view (HFOV) = 23.728deg., System length (TTL) = 5.564 mm, F-number (Fno) = 2.632, Image height = 2.619 mm ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 200 | Aperture stop | ∞ | -0.513 | | | | |
| 211 | 1st lens element | 1.466 | 0.763 | 1.545 | 55.987 | 2.941 | plastic |
| 212 | | 13.643 | 0.026 | | | | |
| 221 | 2nd lens element | 6.006 | 0.200 | 1.661 | 20.412 | -6.993 | plastic |
| 222 | | 2.591 | 0.090 | | | | |
| 231 | 3rd lens element | 4.354 | 0.186 | 1.545 | 55.987 | -28.324 | plastic |
| 232 | | 3.346 | 0.420 | | | | |
| 241 | 4th lens element | -18.275 | 0.302 | 1.642 | 22.409 | -30.386 | plastic |
| 242 | | -259.337 | 0.960 | | | | |
| 251 | 5th lens element | -6.967 | 0.090 | 1.545 | 55.987 | -7.384 | plastic |
| 252 | | 9.625 | 0.040 | | | | |
| 261 | 6th lens element | 6.165 | 0.658 | 1.642 | 22.409 | 15.298 | plastic |
| 262 | | 15.648 | 0.134 | | | | |
| 271 | IR cut filter | ∞ | 0.210 | 1.517 | 64.167 | | |
| 272 | | ∞ | 1.485 | | | | |
| 280 | Image plane | ∞ | 0.000 | | | | |

FIG. 12

| Aspherical parameters | | | | | | |
|---|---|---|---|---|---|---|
| Surface # | 211 | 212 | 221 | 222 | 231 | 232 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | 9.554730E-03 | -6.563610E-02 | -1.747132E-01 | -1.496289E-01 | -8.585904E-02 | -6.935052E-02 |
| $a_6$ | -2.562605E-03 | 2.299795E-01 | 3.985436E-01 | 2.643298E-01 | 1.476668E-01 | 6.789398E-02 |
| $a_8$ | -4.886632E-03 | -1.746646E-01 | -3.163623E-01 | 2.078646E-02 | 2.727628E-01 | 3.396493E-01 |
| $a_{10}$ | 8.413306E-03 | 3.960228E-02 | 1.064260E-01 | -3.101701E-01 | -2.411960E-01 | -6.829564E-01 |
| $a_{12}$ | -4.122784E-03 | 1.356091E-03 | -2.645241E-02 | 4.383468E-01 | -4.557672E-01 | 5.103943E-01 |
| $a_{14}$ | 0.000000E+00 | 0.000000E+00 | 2.149757E-02 | -4.443618E-01 | 7.730969E-01 | 3.490664E-02 |
| $a_{16}$ | 0.000000E+00 | 0.000000E+00 | -8.288169E-03 | 1.745145E-01 | -3.447308E-01 | -3.745768E-02 |
| Surface # | 241 | 242 | 251 | 252 | 261 | 262 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -2.132580E-01 | -1.468616E-01 | -1.241648E-01 | -6.501594E-02 | -5.261086E-02 | -7.932771E-02 |
| $a_6$ | -4.285506E-02 | 8.516309E-02 | -2.155801E-02 | -2.508719E-02 | 1.803878E-02 | 3.101181E-02 |
| $a_8$ | 6.009446E-01 | 1.251533E-01 | 3.790083E-02 | 4.220807E-02 | -5.755244E-03 | -1.148987E-02 |
| $a_{10}$ | -1.205150E+00 | -1.150448E-01 | -5.194104E-03 | -2.543814E-02 | 5.213770E-04 | 3.499350E-03 |
| $a_{12}$ | 1.458972E+00 | 1.119594E-01 | -2.230435E-03 | 7.777573E-03 | -7.138842E-06 | -8.413633E-04 |
| $a_{14}$ | -9.579318E-01 | -8.393039E-02 | 1.031124E-03 | -1.270913E-03 | 2.050461E-05 | 1.168040E-04 |
| $a_{16}$ | 2.393802E-01 | 2.297172E-02 | -1.740832E-04 | 8.295387E-05 | -3.171417E-06 | -5.845224E-06 |

FIG. 13

| Effective focal length (EFL) = 5.816 mm, Half field of view (HFOV) = 24.168deg., System length (TTL) = 5.373 mm, F-number (Fno) = 2.596, Image height= 2.619 mm ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 300 | Aperture stop | ∞ | -0.513 | | | | |
| 311 | 1st lens element | 1.467 | 0.747 | 1.545 | 55.987 | 2.828 | plastic |
| 312 | | 23.966 | 0.034 | | | | |
| 321 | 2nd lens element | 8.500 | 0.243 | 1.661 | 20.412 | -6.174 | plastic |
| 322 | | 2.743 | 0.246 | | | | |
| 331 | 3rd lens element | 4.858 | 0.257 | 1.545 | 55.987 | -27.327 | plastic |
| 332 | | 3.597 | 0.397 | | | | |
| 341 | 4th lens element | -108.201 | 0.151 | 1.642 | 22.409 | -201.337 | plastic |
| 342 | | -637.603 | 1.166 | | | | |
| 351 | 5th lens element | -4.440 | 0.977 | 1.545 | 55.987 | -19.873 | plastic |
| 352 | | -8.096 | 0.049 | | | | |
| 361 | 6th lens element | -7.946 | 0.254 | 1.642 | 22.409 | -8.470 | plastic |
| 362 | | 17.910 | 0.300 | | | | |
| 371 | IR cut filter | ∞ | 0.210 | 1.517 | 64.167 | | |
| 372 | | ∞ | 0.342 | | | | |
| 380 | Image plane | ∞ | 0.000 | | | | |

FIG. 16

| Aspherical parameters | | | | | | |
|---|---|---|---|---|---|---|
| Surface # | 311 | 312 | 321 | 322 | 331 | 332 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | 3.803525E-03 | -7.018125E-02 | -1.730626E-01 | -1.491321E-01 | -1.087171E-01 | -6.596476E-02 |
| $a_6$ | 2.963700E-03 | 2.260293E-01 | 4.023031E-01 | 2.796898E-01 | 1.521664E-01 | 1.120361E-01 |
| $a_8$ | -4.445374E-03 | -1.713489E-01 | -3.133521E-01 | 2.677308E-02 | 2.638310E-01 | 3.230729E-01 |
| $a_{10}$ | 9.433291E-03 | 4.165817E-02 | 1.084265E-01 | -2.955207E-01 | -2.634840E-01 | -6.907849E-01 |
| $a_{12}$ | -3.299797E-03 | -4.848320E-04 | -2.827982E-02 | 4.675171E-01 | -4.436713E-01 | 4.293771E-01 |
| $a_{14}$ | 0.000000E+00 | 0.000000E+00 | 1.968666E-02 | -4.287708E-01 | 7.479602E-01 | -4.808602E-02 |
| $a_{16}$ | 0.000000E+00 | 0.000000E+00 | -6.691291E-03 | 1.908675E-01 | -3.212973E-01 | -8.198213E-02 |
| Surface # | 341 | 342 | 351 | 352 | 361 | 362 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -2.361663E-01 | -1.971736E-01 | -8.173857E-02 | -2.315113E-02 | -2.193437E-02 | -5.611961E-02 |
| $a_6$ | -6.247279E-02 | 4.431419E-02 | -3.523984E-02 | -4.571612E-02 | 1.842603E-02 | 2.995994E-02 |
| $a_8$ | 5.549720E-01 | 9.717069E-02 | 2.355293E-02 | 4.399852E-02 | -5.802156E-03 | -1.163589E-02 |
| $a_{10}$ | -1.217787E+00 | -1.261948E-01 | -1.499992E-02 | -2.532657E-02 | 4.348384E-04 | 3.549872E-03 |
| $a_{12}$ | 1.445505E+00 | 9.064671E-02 | 6.540977E-05 | 7.809867E-03 | -5.642501E-06 | -8.352366E-04 |
| $a_{14}$ | -9.655263E-01 | -8.765497E-02 | 3.435674E-03 | -1.227618E-03 | 2.397721E-05 | 1.145161E-04 |
| $a_{16}$ | 2.152008E-01 | 5.435656E-02 | -2.054320E-03 | 7.244800E-05 | -3.375766E-06 | -6.293372E-06 |

FIG. 17

| Effective focal length (EFL) = 5.817 mm, Half field of view (HFOV) = 24.356deg., System length (TTL) = 5.359 mm, F-number (Fno) = 2.598, Image height = 2.619 mm ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 400 | Aperture stop | ∞ | -0.513 | | | | |
| 411 | 1st lens element | 1.470 | 0.668 | 1.545 | 55.987 | 2.930 | plastic |
| 412 | | 15.144 | 0.051 | | | | |
| 421 | 2nd lens element | 6.049 | 0.228 | 1.661 | 20.412 | -6.360 | plastic |
| 422 | | 2.456 | 0.412 | | | | |
| 431 | 3rd lens element | 5.328 | 0.230 | 1.545 | 55.987 | -21.715 | plastic |
| 432 | | 3.621 | 0.567 | | | | |
| 441 | 4th lens element | -6.580 | 0.215 | 1.642 | 22.409 | -172.672 | plastic |
| 442 | | -7.082 | 1.109 | | | | |
| 451 | 5th lens element | 10.981 | 0.263 | 1.545 | 55.987 | -13.458 | plastic |
| 452 | | 4.366 | 0.302 | | | | |
| 461 | 6th lens element | 16.728 | 0.367 | 1.642 | 22.409 | -23.405 | plastic |
| 462 | | 7.882 | 0.300 | | | | |
| 471 | IR cut filter | ∞ | 0.210 | 1.517 | 64.167 | | |
| 472 | | ∞ | 0.436 | | | | |
| 480 | Image plane | ∞ | 0.000 | | | | |

FIG. 20

| Aspherical parameters | | | | | | |
|---|---|---|---|---|---|---|
| Surface # | 411 | 412 | 421 | 422 | 431 | 432 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | 3.490055E-03 | -6.606258E-02 | -1.729406E-01 | -1.322405E-01 | -8.679755E-02 | -6.070748E-02 |
| $a_6$ | 3.591570E-03 | 2.230941E-01 | 4.054153E-01 | 2.638862E-01 | 1.461993E-01 | 1.209720E-01 |
| $a_8$ | -2.387257E-03 | -1.757129E-01 | -3.150163E-01 | 2.435098E-02 | 2.727740E-01 | 3.854469E-01 |
| $a_{10}$ | 8.951217E-03 | 4.155526E-02 | 1.047128E-01 | -2.887276E-01 | -2.402407E-01 | -6.916689E-01 |
| $a_{12}$ | -3.787521E-03 | 2.790084E-03 | -2.703328E-02 | 4.681800E-01 | -4.548364E-01 | 4.515727E-01 |
| $a_{14}$ | 0.000000E+00 | 0.000000E+00 | 2.230759E-02 | -4.178989E-01 | 7.745434E-01 | -3.756036E-02 |
| $a_{16}$ | 0.000000E+00 | 0.000000E+00 | -6.483028E-03 | 1.909899E-01 | -3.448518E-01 | -9.188318E-02 |
| Surface # | 441 | 442 | 451 | 452 | 461 | 462 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -2.244726E-01 | -1.833954E-01 | -1.198244E-01 | -8.778789E-02 | -4.184488E-02 | -7.670535E-02 |
| $a_6$ | -6.626477E-02 | 5.289800E-02 | -1.996052E-02 | -2.708470E-02 | 1.905640E-02 | 3.121536E-02 |
| $a_8$ | 5.921776E-01 | 1.033511E-01 | 3.590366E-02 | 4.351103E-02 | -5.952930E-03 | -1.137406E-02 |
| $a_{10}$ | -1.210531E+00 | -1.251804E-01 | -6.299863E-03 | -2.510882E-02 | 4.597495E-04 | 3.520533E-03 |
| $a_{12}$ | 1.458027E+00 | 1.115796E-01 | -2.520307E-03 | 7.803297E-03 | -1.089052E-05 | -8.416300E-04 |
| $a_{14}$ | -9.570476E-01 | -8.053354E-02 | 1.031960E-03 | -1.275048E-03 | 2.178205E-05 | 1.156615E-04 |
| $a_{16}$ | 2.342696E-01 | 2.623682E-02 | -1.043290E-04 | 8.429704E-05 | -2.667046E-06 | -6.216362E-06 |

FIG. 21

| Effective focal length (EFL) = 5.859 mm, Half field of view (HFOV) = 23.898deg., System length (TTL) = 5.414 mm, F-number (Fno) = 2.619, Image height= 2.619 mm | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 500 | Aperture stop | ∞ | -0.513 | | | | |
| 511 | 1st lens element | 1.485 | 0.796 | 1.545 | 55.987 | 2.977 | plastic |
| 512 | | 13.833 | 0.032 | | | | |
| 521 | 2nd lens element | 6.145 | 0.242 | 1.661 | 20.412 | -6.941 | plastic |
| 522 | | 2.599 | 0.296 | | | | |
| 531 | 3rd lens element | 6.562 | 0.371 | 1.545 | 55.987 | -27.300 | plastic |
| 532 | | 4.466 | 0.421 | | | | |
| 541 | 4th lens element | -16.798 | 0.233 | 1.642 | 22.409 | -67.670 | plastic |
| 542 | | -27.396 | 1.193 | | | | |
| 551 | 5th lens element | -4.992 | 0.297 | 1.545 | 55.987 | -5.446 | plastic |
| 552 | | 7.519 | 0.121 | | | | |
| 561 | 6th lens element | 21.732 | 0.743 | 1.642 | 22.409 | 69.802 | plastic |
| 562 | | 41.307 | 0.300 | | | | |
| 571 | IR cut filter | ∞ | 0.210 | 1.517 | 64.167 | | |
| 572 | | ∞ | 0.160 | | | | |
| 580 | Image plane | ∞ | 0.000 | | | | |

FIG. 24

| Aspherical parameters | | | | | | |
|---|---|---|---|---|---|---|
| Surface # | 511 | 512 | 521 | 522 | 531 | 532 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | 3.892522E-03 | -6.677424E-02 | -1.752543E-01 | -1.379791E-01 | -8.039220E-02 | -7.060758E-02 |
| $a_6$ | 8.865852E-04 | 2.236280E-01 | 4.018810E-01 | 2.728913E-01 | 1.431400E-01 | 1.091804E-01 |
| $a_8$ | -2.998392E-03 | -1.761004E-01 | -3.174166E-01 | 3.219312E-02 | 2.700080E-01 | 3.708835E-01 |
| $a_{10}$ | 8.816180E-03 | 4.038036E-02 | 1.033439E-01 | -2.903071E-01 | -2.430230E-01 | -6.976139E-01 |
| $a_{12}$ | -3.965096E-03 | 1.299466E-03 | -2.803575E-02 | 4.599032E-01 | -4.556398E-01 | 4.582146E-01 |
| $a_{14}$ | 2.980563E-04 | 1.285508E-04 | 2.145773E-02 | -4.253884E-01 | 7.788205E-01 | -2.248178E-02 |
| $a_{16}$ | 2.540111E-04 | 1.353662E-04 | -7.014049E-03 | 1.909897E-01 | -3.316579E-01 | -7.998530E-02 |
| Surface # | 541 | 542 | 551 | 552 | 561 | 562 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -2.288839E-01 | -1.743568E-01 | -1.089367E-01 | -7.107834E-02 | -3.923549E-02 | -7.577649E-02 |
| $a_6$ | -6.408771E-02 | 6.142266E-02 | -1.925708E-02 | -2.553914E-02 | 1.896416E-02 | 3.131196E-02 |
| $a_8$ | 6.009121E-01 | 1.083499E-01 | 3.603316E-02 | 4.310487E-02 | -5.931879E-03 | -1.141269E-02 |
| $a_{10}$ | -1.193364E+00 | -1.235614E-01 | -6.254229E-03 | -2.522633E-02 | 4.655820E-04 | 3.509645E-03 |
| $a_{12}$ | 1.466620E+00 | 1.114887E-01 | -2.516633E-03 | 7.791150E-03 | -1.072141E-05 | -8.431688E-04 |
| $a_{14}$ | -9.667071E-01 | -8.155683E-02 | 1.032420E-03 | -1.272439E-03 | 2.151109E-05 | 1.155656E-04 |
| $a_{16}$ | 2.071606E-01 | 2.417840E-02 | -1.025043E-04 | 8.633545E-05 | -2.793025E-06 | -6.192907E-06 |

FIG. 25

| Effective focal length (EFL) = 5.906 mm, Half field of view (HFOV) = 23.774 deg., System length (TTL) = 5.451 mm, F-number (Fno) = 2.628, Image height= 2.619 mm ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 600 | Aperture stop | ∞ | -0.513 | | | | |
| 611 | 1st lens element | 1.479 | 0.782 | 1.545 | 55.987 | 2.964 | plastic |
| 612 | | 13.922 | 0.008 | | | | |
| 621 | 2nd lens element | 5.480 | 0.238 | 1.661 | 20.412 | -6.884 | plastic |
| 622 | | 2.455 | 0.326 | | | | |
| 631 | 3rd lens element | 14.028 | 0.294 | 1.545 | 55.987 | -20.412 | plastic |
| 632 | | 6.166 | 0.323 | | | | |
| 641 | 4th lens element | -46.400 | 0.238 | 1.642 | 22.409 | 253.654 | plastic |
| 642 | | -36.250 | 1.366 | | | | |
| 651 | 5th lens element | -5.821 | 0.288 | 1.545 | 55.987 | -6.140 | plastic |
| 652 | | 8.054 | 0.130 | | | | |
| 661 | 6th lens element | 47.571 | 0.634 | 1.642 | 22.409 | 134.311 | plastic |
| 662 | | 104.499 | 0.300 | | | | |
| 671 | IR cut filter | ∞ | 0.210 | 1.517 | 64.167 | | |
| 672 | | ∞ | 0.314 | | | | |
| 680 | Image plane | ∞ | 0.000 | | | | |

FIG. 28

| Aspherical parameters | | | | | | |
|---|---|---|---|---|---|---|
| Surface # | 611 | 612 | 621 | 622 | 631 | 632 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | 5.745343E-03 | -6.348229E-02 | -1.765950E-01 | -1.361516E-01 | -7.111560E-02 | -9.071075E-02 |
| $a_6$ | 6.711771E-04 | 2.251171E-01 | 4.030706E-01 | 2.673051E-01 | 1.442239E-01 | 1.106221E-01 |
| $a_8$ | -3.448344E-03 | -1.755540E-01 | -3.154259E-01 | 2.491483E-02 | 2.676293E-01 | 3.763124E-01 |
| $a_{10}$ | 8.655374E-03 | 4.096520E-02 | 1.048631E-01 | -2.921473E-01 | -2.454789E-01 | -7.003070E-01 |
| $a_{12}$ | -3.941233E-03 | 1.054859E-03 | -2.714935E-02 | 4.633766E-01 | -4.565834E-01 | 4.510534E-01 |
| $a_{14}$ | 3.365371E-04 | 1.821475E-04 | 2.180655E-02 | -4.202143E-01 | 7.803998E-01 | -2.674510E-02 |
| $a_{16}$ | 2.265081E-04 | 4.133938E-04 | -7.179891E-03 | 1.933228E-01 | -3.272003E-01 | -7.503409E-02 |
| Surface # | 641 | 642 | 651 | 652 | 661 | 662 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -2.347736E-01 | -1.605453E-01 | -1.109057E-01 | -7.154644E-02 | -3.886631E-02 | -7.518829E-02 |
| $a_6$ | -5.461700E-02 | 6.322431E-02 | -1.974431E-02 | -2.537962E-02 | 1.896091E-02 | 3.135552E-02 |
| $a_8$ | 6.034252E-01 | 1.089526E-01 | 3.597015E-02 | 4.319696E-02 | -5.941046E-03 | -1.140241E-02 |
| $a_{10}$ | -1.201928E+00 | -1.227440E-01 | -6.257659E-03 | -2.520272E-02 | 4.639640E-04 | 3.511679E-03 |
| $a_{12}$ | 1.459116E+00 | 1.121428E-01 | -2.514668E-03 | 7.794688E-03 | -1.074465E-05 | -8.429349E-04 |
| $a_{14}$ | -9.655061E-01 | -8.100540E-02 | 1.033312E-03 | -1.272337E-03 | 2.158033E-05 | 1.155595E-04 |
| $a_{16}$ | 2.184396E-01 | 2.486845E-02 | -1.021456E-04 | 8.618476E-05 | -2.767220E-06 | -6.204184E-06 |

FIG. 29

| Effective focal length (EFL) = 5.958 mm, Half field of view (HFOV) = 23.501 deg., System length (TTL) = 5.572 mm, F-number (Fno) = 2.658, Image height= 2.619 mm ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 700 | Aperture stop | ∞ | -0.513 | | | | |
| 711 | 1st lens element | 1.466 | 0.761 | 1.545 | 55.987 | 2.941 | plastic |
| 712 | | 13.709 | 0.026 | | | | |
| 721 | 2nd lens element | 5.943 | 0.199 | 1.661 | 20.412 | -7.000 | plastic |
| 722 | | 2.580 | 0.096 | | | | |
| 731 | 3rd lens element | 4.337 | 0.188 | 1.545 | 55.987 | -28.456 | plastic |
| 732 | | 3.339 | 0.421 | | | | |
| 741 | 4th lens element | -18.946 | 0.304 | 1.642 | 22.409 | -30.347 | plastic |
| 742 | | -535.933 | 0.964 | | | | |
| 751 | 5th lens element | -7.888 | 0.094 | 1.545 | 55.987 | -7.294 | plastic |
| 752 | | 8.085 | 0.040 | | | | |
| 761 | 6th lens element | 6.305 | 0.662 | 1.642 | 22.409 | 15.989 | plastic |
| 762 | | 15.469 | 0.134 | | | | |
| 771 | IR cut filter | ∞ | 0.210 | 1.517 | 64.167 | | |
| 772 | | ∞ | 1.473 | | | | |
| 780 | Image plane | ∞ | 0.000 | | | | |

FIG. 32

| Aspherical parameters | | | | | | |
|---|---|---|---|---|---|---|
| Surface # | 711 | 712 | 721 | 722 | 731 | 732 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | 9.772566E-03 | -6.563450E-02 | -1.747315E-01 | -1.492756E-01 | -8.575101E-02 | -6.885064E-02 |
| $a_6$ | -2.375578E-03 | 2.298889E-01 | 3.986172E-01 | 2.646519E-01 | 1.477570E-01 | 6.793320E-02 |
| $a_8$ | -4.682872E-03 | -1.746251E-01 | -3.163914E-01 | 2.106521E-02 | 2.729218E-01 | 3.392194E-01 |
| $a_{10}$ | 8.551001E-03 | 3.974054E-02 | 1.063115E-01 | -3.098889E-01 | -2.412457E-01 | -6.832647E-01 |
| $a_{12}$ | -4.048532E-03 | 1.498432E-03 | -2.656448E-02 | 4.385070E-01 | -4.559499E-01 | 5.114765E-01 |
| $a_{14}$ | 0.000000E+00 | 0.000000E+00 | 2.143764E-02 | -4.444400E-01 | 7.730518E-01 | 3.819820E-02 |
| $a_{16}$ | 0.000000E+00 | 0.000000E+00 | -8.285224E-03 | 1.741502E-01 | -3.444163E-01 | -3.213616E-02 |
| Surface # | 741 | 742 | 751 | 752 | 761 | 762 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -2.153552E-01 | -1.463443E-01 | -1.231295E-01 | -6.515392E-02 | -5.247178E-02 | -7.885951E-02 |
| $a_6$ | -4.401297E-02 | 8.471096E-02 | -2.135772E-02 | -2.506247E-02 | 1.802297E-02 | 3.108967E-02 |
| $a_8$ | 6.021671E-01 | 1.245484E-01 | 3.785071E-02 | 4.222084E-02 | -5.758210E-03 | -1.147631E-02 |
| $a_{10}$ | -1.201921E+00 | -1.153339E-01 | -5.232704E-03 | -2.543992E-02 | 5.231014E-04 | 3.500612E-03 |
| $a_{12}$ | 1.461504E+00 | 1.119783E-01 | -2.245159E-03 | 7.776658E-03 | -6.311153E-06 | -8.415155E-04 |
| $a_{14}$ | -9.572011E-01 | -8.348036E-02 | 1.029048E-03 | -1.269452E-03 | 2.056527E-05 | 1.166803E-04 |
| $a_{16}$ | 2.381749E-01 | 2.382098E-02 | -1.713197E-04 | 8.499282E-05 | -3.277022E-06 | -5.889109E-06 |

FIG. 33

| Effective focal length (EFL) = 5.802 mm, Half field of view (HFOV) = 24.313 deg., System length (TTL) = 5.406 mm, F-number (Fno) = 2.588, Image height = 2.619 mm ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 800 | Aperture stop | ∞ | -0.513 | | | | |
| 811 | 1st lens element | 1.469 | 0.627 | 1.545 | 55.987 | 2.950 | plastic |
| 812 | | 14.108 | 0.056 | | | | |
| 821 | 2nd lens element | 5.574 | 0.256 | 1.661 | 20.412 | -7.294 | plastic |
| 822 | | 2.550 | 0.345 | | | | |
| 831 | 3rd lens element | 4.361 | 0.175 | 1.545 | 55.987 | -23.173 | plastic |
| 832 | | 3.198 | 0.482 | | | | |
| 841 | 4th lens element | -22.143 | 0.218 | 1.642 | 22.409 | -34.284 | plastic |
| 842 | | -9851.583 | 1.031 | | | | |
| 851 | 5th lens element | -18.190 | 0.297 | 1.545 | 55.987 | -7.790 | plastic |
| 852 | | 5.587 | 0.093 | | | | |
| 861 | 6th lens element | 7.695 | 0.715 | 1.642 | 22.409 | 44.879 | plastic |
| 862 | | 10.086 | 0.300 | | | | |
| 871 | IR cut filter | ∞ | 0.210 | 1.517 | 64.167 | | |
| 872 | | ∞ | 0.602 | | | | |
| 880 | Image plane | ∞ | 0.000 | | | | |

FIG. 36

| Aspherical parameters | | | | | | |
|---|---|---|---|---|---|---|
| Surface # | 811 | 812 | 821 | 822 | 831 | 832 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | 5.101342E-03 | -6.677592E-02 | -1.749742E-01 | -1.376331E-01 | -8.157710E-02 | -6.319653E-02 |
| $a_6$ | 2.782617E-03 | 2.233403E-01 | 4.031179E-01 | 2.637456E-01 | 1.534736E-01 | 1.151297E-01 |
| $a_8$ | -2.026553E-03 | -1.756816E-01 | -3.166903E-01 | 2.336983E-02 | 2.760450E-01 | 3.815466E-01 |
| $a_{10}$ | 9.227400E-03 | 4.121770E-02 | 1.036820E-01 | -2.950782E-01 | -2.430646E-01 | -6.946610E-01 |
| $a_{12}$ | -3.826110E-03 | 2.194160E-03 | -2.771618E-02 | 4.590741E-01 | -4.604955E-01 | 4.504366E-01 |
| $a_{14}$ | 0.000000E+00 | 0.000000E+00 | 2.202000E-02 | -4.243340E-01 | 7.698408E-01 | -3.643487E-02 |
| $a_{16}$ | 0.000000E+00 | 0.000000E+00 | -6.106646E-03 | 1.905879E-01 | -3.453871E-01 | -9.220326E-02 |
| Surface # | 841 | 842 | 851 | 852 | 861 | 862 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -2.220183E-01 | -1.747360E-01 | -1.081665E-01 | -6.236470E-02 | -3.914531E-02 | -7.220472E-02 |
| $a_6$ | -6.380730E-02 | 6.056379E-02 | -1.828552E-02 | -2.708756E-02 | 1.923934E-02 | 3.103813E-02 |
| $a_8$ | 5.854932E-01 | 1.115689E-01 | 3.618569E-02 | 4.305086E-02 | -5.929086E-03 | -1.141751E-02 |
| $a_{10}$ | -1.208770E+00 | -1.203952E-01 | -6.237374E-03 | -2.521382E-02 | 4.629858E-04 | 3.513069E-03 |
| $a_{12}$ | 1.462113E+00 | 1.136013E-01 | -2.518660E-03 | 7.794926E-03 | -1.120218E-05 | -8.425221E-04 |
| $a_{14}$ | -9.569717E-01 | -8.036328E-02 | 1.029292E-03 | -1.271750E-03 | 2.145529E-05 | 1.156264E-04 |
| $a_{16}$ | 2.314166E-01 | 2.492787E-02 | -1.047162E-04 | 8.643746E-05 | -2.799165E-06 | -6.195893E-06 |

FIG. 37

| Effective focal length (EFL) = 5.814 mm, Half field of view (HFOV) = 24.436 deg., System length (TTL) = 5.401 mm, F-number (Fno) = 2.601, Image height= 2.619 mm ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 900 | Aperture stop | ∞ | -0.513 | | | | |
| 911 | 1st lens element | 1.465 | 0.748 | 1.545 | 55.987 | 2.940 | plastic |
| 912 | | 13.705 | 0.047 | | | | |
| 921 | 2nd lens element | 5.803 | 0.240 | 1.661 | 20.412 | -7.161 | plastic |
| 922 | | 2.577 | 0.314 | | | | |
| 931 | 3rd lens element | 4.764 | 0.253 | 1.545 | 55.987 | -28.001 | plastic |
| 932 | | 3.565 | 0.422 | | | | |
| 941 | 4th lens element | -17.873 | 0.196 | 1.642 | 22.409 | -27.613 | plastic |
| 942 | | -423763.631 | 1.151 | | | | |
| 951 | 5th lens element | -9.131 | 0.162 | 1.545 | 55.987 | -6.184 | plastic |
| 952 | | 5.396 | 0.057 | | | | |
| 961 | 6th lens element | 12.067 | 1.039 | 1.642 | 22.409 | 54.750 | plastic |
| 962 | | 17.678 | 0.300 | | | | |
| 971 | IR cut filter | ∞ | 0.210 | 1.517 | 64.167 | | |
| 972 | | ∞ | 0.264 | | | | |
| 980 | Image plane | ∞ | 0.000 | | | | |

FIG. 40

| Aspherical parameters | | | | | | |
|---|---|---|---|---|---|---|
| Surface # | 911 | 912 | 921 | 922 | 931 | 932 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | 3.934103E-03 | -6.685105E-02 | -1.755296E-01 | -1.384550E-01 | -7.947237E-02 | -6.876805E-02 |
| $a_6$ | 1.305096E-03 | 2.231489E-01 | 4.021627E-01 | 2.687438E-01 | 1.481133E-01 | 1.095998E-01 |
| $a_8$ | -2.668313E-03 | -1.763939E-01 | -3.172060E-01 | 2.780218E-02 | 2.710409E-01 | 3.741975E-01 |
| $a_{10}$ | 9.020110E-03 | 4.020507E-02 | 1.034223E-01 | -2.937619E-01 | -2.460850E-01 | -6.997615E-01 |
| $a_{12}$ | -3.874212E-03 | 1.126321E-03 | -2.801841E-02 | 4.572221E-01 | -4.616252E-01 | 4.491682E-01 |
| $a_{14}$ | 0.000000E+00 | 0.000000E+00 | 2.146446E-02 | -4.278068E-01 | 7.708506E-01 | -3.553374E-02 |
| $a_{16}$ | 0.000000E+00 | 0.000000E+00 | -6.993492E-03 | 1.881144E-01 | -3.409829E-01 | -9.326413E-02 |
| Surface # | 941 | 942 | 951 | 952 | 961 | 962 |
| K | 0.000000E+00 | 0.000000E+00 | 0.000000E+00 | 0.000000E+00 | 0.000000E+00 | 0.000000E+00 |
| $a_2$ | 0.000000E+00 | 0.000000E+00 | 0.000000E+00 | 0.000000E+00 | 0.000000E+00 | 0.000000E+00 |
| $a_4$ | -2.351694E-01 | -1.672642E-01 | -1.052283E-01 | -6.685061E-02 | -3.536640E-02 | -7.537514E-02 |
| $a_6$ | -6.419142E-02 | 6.284346E-02 | -1.813702E-02 | -2.494412E-02 | 1.842957E-02 | 3.108615E-02 |
| $a_8$ | 5.902502E-01 | 1.113028E-01 | 3.620321E-02 | 4.312930E-02 | -5.999453E-03 | -1.141047E-02 |
| $a_{10}$ | -1.205902E+00 | -1.214166E-01 | -6.233362E-03 | -2.526087E-02 | 4.636765E-04 | 3.507458E-03 |
| $a_{12}$ | 1.459927E+00 | 1.131506E-01 | -2.519387E-03 | 7.781344E-03 | -1.132944E-05 | -8.438469E-04 |
| $a_{14}$ | -9.646894E-01 | -7.994574E-02 | 1.028336E-03 | -1.274203E-03 | 2.098840E-05 | 1.154749E-04 |
| $a_{16}$ | 2.187218E-01 | 2.599902E-02 | -1.051813E-04 | 8.611651E-05 | -3.013254E-06 | -6.195363E-06 |

FIG. 41

| Embodiment | 1st | 2nd | 3rd | 4th | 5th |
|---|---|---|---|---|---|
| ALT | 2.668 | 2.199 | 2.629 | 1.972 | 2.682 |
| AAG | 1.870 | 1.536 | 1.892 | 2.441 | 2.063 |
| BFL | 0.860 | 1.829 | 0.852 | 0.946 | 0.670 |
| TTL | 5.397 | 5.564 | 5.373 | 5.359 | 5.414 |
| Gmax | 1.160 | 0.960 | 1.166 | 1.109 | 1.193 |
| T1 / (T3+T4) | 1.303 | 1.565 | 1.832 | 1.500 | 1.318 |
| ALT / Gmax | 2.299 | 2.290 | 2.256 | 1.778 | 2.248 |
| T1 / T3 | 2.716 | 4.100 | 2.906 | 2.904 | 2.144 |
| ALT / (T4+T6) | 2.471 | 2.290 | 6.500 | 3.383 | 2.749 |
| TTL / (T5+T6) | 4.995 | 7.439 | 4.363 | 8.499 | 5.207 |
| BFL / T3 | 3.060 | 9.823 | 3.314 | 4.112 | 1.804 |
| AAG / (G1+G3) | 4.143 | 3.444 | 4.390 | 3.948 | 4.558 |
| ALT / (T2+T3) | 5.137 | 5.699 | 5.255 | 4.304 | 4.375 |
| Gmax / T3 | 4.130 | 5.156 | 4.535 | 4.822 | 3.213 |
| TTL / T6 | 6.967 | 8.451 | 21.165 | 14.584 | 7.290 |
| AAG / (G2+G4) | 1.348 | 1.463 | 1.340 | 1.605 | 1.386 |
| ALT / T2 | 11.193 | 11.016 | 10.805 | 8.643 | 11.100 |
| TTL / (G3+G5) | 12.091 | 12.090 | 12.039 | 6.162 | 9.983 |
| AAG / (T1+T4) | 1.751 | 1.443 | 2.108 | 2.764 | 2.005 |
| TTL / Gmax | 4.652 | 5.796 | 4.610 | 4.832 | 4.538 |
| ALT / (G2+G4) | 1.923 | 2.093 | 1.863 | 1.297 | 1.801 |
| T1 / T4 | 2.503 | 2.530 | 4.957 | 3.101 | 3.420 |
| AAG / (T4+T6) | 1.732 | 1.600 | 4.677 | 4.188 | 2.114 |
| ALT / (G1+G4) | 2.229 | 2.230 | 2.192 | 1.700 | 2.190 |
| TTL / (T1+T3) | 5.170 | 5.860 | 5.352 | 5.968 | 4.638 |
| AAG / T2 | 7.845 | 7.698 | 7.775 | 10.699 | 8.538 |

FIG. 42A

| Embodiment | 6th | 7th | 8th | 9th |
|---|---|---|---|---|
| ALT | 2.474 | 2.209 | 2.287 | 2.636 |
| AAG | 2.154 | 1.546 | 2.006 | 1.991 |
| BFL | 0.824 | 1.817 | 1.112 | 0.774 |
| TTL | 5.451 | 5.572 | 5.406 | 5.401 |
| Gmax | 1.366 | 0.964 | 1.031 | 1.151 |
| T1 / (T3+T4) | 1.472 | 1.545 | 1.598 | 1.669 |
| ALT / Gmax | 1.810 | 2.292 | 2.218 | 2.291 |
| T1 / T3 | 2.661 | 4.041 | 3.588 | 2.962 |
| ALT / (T4+T6) | 2.839 | 2.286 | 2.453 | 2.136 |
| TTL / (T5+T6) | 5.915 | 7.377 | 5.343 | 4.500 |
| BFL / T3 | 2.802 | 9.645 | 6.361 | 3.064 |
| AAG / (G1+G3) | 6.500 | 3.463 | 3.734 | 4.242 |
| ALT / (T2+T3) | 4.650 | 5.699 | 5.309 | 5.356 |
| Gmax / T3 | 4.646 | 5.116 | 5.900 | 4.557 |
| TTL / T6 | 8.604 | 8.421 | 7.562 | 5.201 |
| AAG / (G2+G4) | 1.272 | 1.459 | 1.458 | 1.360 |
| ALT / T2 | 10.398 | 11.092 | 8.933 | 10.999 |
| TTL / (G3+G5) | 12.029 | 12.090 | 9.406 | 11.256 |
| AAG / (T1+T4) | 2.111 | 1.451 | 2.375 | 2.110 |
| TTL / Gmax | 3.989 | 5.781 | 5.242 | 4.694 |
| ALT / (G2+G4) | 1.461 | 2.085 | 1.662 | 1.800 |
| T1 / T4 | 3.293 | 2.501 | 2.881 | 3.824 |
| AAG / (T4+T6) | 2.472 | 1.601 | 2.152 | 1.614 |
| ALT / (G1+G4) | 1.800 | 2.231 | 2.105 | 2.201 |
| TTL / (T1+T3) | 5.064 | 5.867 | 6.740 | 5.398 |
| AAG / T2 | 9.053 | 7.766 | 7.836 | 8.309 |

FIG. 42B

OPTICAL IMAGING LENS

CROSS-REFERENCE TO RELATED APPLICATION

This application claims priority to P.R.C. Patent Application No. 201610740873.5, filed on Aug. 26, 2016, which is incorporated herein by its entirety.

TECHNICAL FIELD

The present disclosure relates to an optical imaging lens, and particularly, to an optical imaging lens having six lens elements.

BACKGROUND

Technology improves every day, continuously expanding consumer demand for increasingly compact electronic devices. This applies in the context of telephoto lens characteristics, in that key components for optical imaging lenses incorporated into consumer electronic products should keep pace with technological improvements in order to meet the expectations of consumers. Some important characteristics of an optical imaging lens include image quality and size. Improvements in image sensor technology play an important role in maintaining image quality while making the devices more compact. However, reducing the size of the imaging lens while achieving good optical characteristics presents challenging problems. For example, in a typical optical imaging lens system having six lens elements, the distance from the object side surface of the first lens element to the image plane along the optical axis is too large to accommodate the dimensions of today's cell phones or digital cameras.

Decreasing the dimensions of an optical lens while maintaining good optical performance may not only be achieved by scaling down the lens. Rather, these benefits may be realized by improving other aspects of the design process, such as by varying the material used for the lens, or by adjusting the assembly yield.

In this manner, there is a continuing need for improving the design characteristics of optical lenses that may have increasingly small dimensions. Achieving these advancements may require overcoming unique challenges, even when compared to design improvements for traditional optical lenses. However, refining aspects of the optical lens manufacturing process that result in a lens that meets consumer demand and provides upgrades to imaging quality continues to be a desirable objective for industries, governments, and academia.

SUMMARY

The present disclosure provides for an optical imaging lens. By controlling the convex or concave shape of the surfaces of each lens element and the parameters in at least two equations, the length of the optical imaging lens may be shortened while maintaining good optical characteristics and system functionality.

In some embodiments, an optical imaging lens may comprise sequentially from an object side to an image side along an optical axis, a first, second, third, fourth, fifth and sixth lens elements, and a filtering unit. Each of the first, second, third, fourth, fifth and sixth lens elements have varying refracting power in some embodiments. Additionally, the optical imaging lens may comprise an object-side surface facing toward the object side, an image-side surface facing toward the image side, and a central thickness defined along the optical axis.

According to some embodiments of the optical imaging lens of the present disclosure, the image-side surface of the first lens element may comprise a concave portion in a vicinity of the optical axis; the object-side surface of the fourth lens element may comprise a concave portion in a vicinity of a periphery of the fourth lens element; the object-side surface of the sixth lens element may comprise a concave portion in a vicinity of a periphery of the sixth lens element; and the optical imaging lens may comprise no other lenses having refracting power beyond the six lens elements. Further, a central thickness of the first lens element along the optical axis is represented by T1, a central thickness of the third lens element along the optical axis is represented by T3, a central thickness of the fourth lens element along the optical axis is represented by T4, a sum of the central thicknesses of all lens elements is represented by ALT, a maximum value of the air gaps between two adjacent lens elements of the first lens element to the sixth lens element is represented by Gmax, and T1, T3, T4, ALT and Gmax could be controlled to satisfy the equations as follows:

$$1.3 \leq T1/(T3+T4) \qquad \text{Equation (1); and}$$

$$ALT/Gmax \leq 2.3 \qquad \text{Equation (2).}$$

In other exemplary embodiments, other parameters could be taken into consideration. For example, T1 and T3 could be controlled to satisfy the equation as follows:

$$T1/T3 \leq 4.10 \qquad \text{Equation (3);}$$

a central thickness of the sixth lens element along the optical axis is represented by T6, and ALT, T4 and T6 could be controlled to satisfy the equation as follows:

$$ALT/(T4+T6) \leq 6.50 \qquad \text{Equation (4);}$$

a distance between the object-side surface of the first lens element and an image plane along the optical axis is represented by TTL, and TTL, T5 and T6 could be controlled to satisfy the equation as follows:

$$TTL/(T5+T6) \leq 8.50 \qquad \text{Equation (5);}$$

a back focal length of the optical imaging lens is represented by BFL, and BFL and T3 could be controlled to satisfy the equation as follows:

$$1.80 \leq BFL/T3 \qquad \text{Equation (6);}$$

a sum of all air gaps between all lens elements along the optical axis is represented by AAG, an air gap between the first lens element and the second lens element along the optical axis is represented by G1, an air gap between the third lens element and the fourth lens element along the optical axis is represented by G3, and AAG, G1 and G3 could be controlled to satisfy the equation as follows:

$$AAG/(G1+G3) \leq 6.50 \qquad \text{Equation (7);}$$

a central thickness of the second lens element along the optical axis is represented by T2, and ALT, T2 and T3 could be controlled to satisfy the equation as follows:

$$ALT/(T2+T3) \leq 5.70 \qquad \text{Equation (8);}$$

Gmax and T3 could be controlled to satisfy the equation as follows:

$$Gmax/T3 \leq 5.90 \qquad \text{Equation (9);}$$

TTL and T6 could be controlled to satisfy the equation as follows:

$$5.20 \leq TTL/T6 \quad \text{Equation (10);}$$

an air gap between the second lens element and the third lens element along the optical axis is represented by G2, an air gap between the third lens element and the fourth lens element along the optical axis is represented by G4, and AAG, G2 and G4 could be controlled to satisfy the equation as follows:

$$1.10 \leq AAG/(G2+G4) \quad \text{Equation (11);}$$

ALT and T2 could be controlled to satisfy the equation as follows:

$$ALT/T2 \leq 11.20 \quad \text{Equation (12);}$$

an air gap between the fifth lens element and the sixth lens element along the optical axis is represented by G5, and TTL, G3 and G5 could be controlled to satisfy the equation as follows:

$$TTL/(G3+G5) \leq 12.10 \quad \text{Equation (13);}$$

AAG, T1 and T4 could be controlled to satisfy the equation as follows:

$$AAG/(T1+T4) \leq 8.20 \quad \text{Equation (14);}$$

TTL and Gmax could be controlled to satisfy the equation as follows:

$$TTL/Gmax \leq 6.30 \quad \text{Equation (15);}$$

ALT, G2 and G4 could be controlled to satisfy the equation as follows:

$$0.80 \leq ALT/(G2+G4) \quad \text{Equation (16);}$$

T1 and T4 could be controlled to satisfy the equation as follows:

$$2.50 \leq T1/T4 \quad \text{Equation (17);}$$

AAG, T4 and T6 could be controlled to satisfy the equation as follows:

$$1.60 \leq AAG/(T4+T6) \quad \text{Equation (18);}$$

ALT, G1 and G4 could be controlled to satisfy the equation as follows:

$$ALT/(G1+G4) \leq 6.80 \quad \text{Equation (19);}$$

TTL, T1 and T3 could be controlled to satisfy the equation as follows:

$$TTL/(T1+T3) \leq 8.20 \quad \text{Equation(20); or}$$

AAg and T2 could be controlled to satisfy the equation as follows:

$$AAG/T2 \leq 10.70 \quad \text{Equation (21).}$$

The present disclosure is not limited to the aforesaid embodiments, and parts of the aforesaid embodiments could be selectively incorporated in other embodiments described herein. In some embodiments, more details about the convex or concave surface structure could be incorporated for one specific lens element or broadly for plural lens elements to enhance the control for the system performance and/or resolution. It is noted that the details listed here could be incorporated into example embodiments if no inconsistency occurs.

By controlling the convex or concave shape of the surfaces, exemplary embodiments of the optical imaging lens systems herein achieve good optical characteristics, provide an enlarged aperture, narrow the field of view, increase assembly yield, and effectively shorten the length of the optical imaging lens.

BRIEF DESCRIPTION OF THE DRAWINGS

Exemplary embodiments will be more readily understood from the following detailed description when read in conjunction with the appended drawing, in which:

FIG. 1 depicts a cross-sectional view of one single lens element according to the present disclosure;

FIG. 2 depicts a schematic view of the relation between the surface shape and the optical focus of the lens element;

FIG. 8 depicts a table of optical data for each lens element of the optical imaging lens of a first embodiment of the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of a sixth embodiment of an optical imaging lens according to the present disclosure;

FIG. 29 depicts a table of aspherical data of a sixth embodiment of the optical imaging lens according to the present disclosure;

FIG. 32 depicts a table of optical data for each lens element of the optical imaging lens of a seventh embodiment of the present disclosure;

FIG. 33 depicts a table of aspherical data of a seventh embodiment of the optical imaging lens according to the present disclosure;

FIG. 36 depicts a table of optical data for each lens element of the optical imaging lens of an eighth embodiment of the present disclosure;

FIG. 37 depicts a table of aspherical data of an eighth embodiment of the optical imaging lens according to the present disclosure;

FIG. 40 depicts a table of optical data for each lens element of the optical imaging lens of a ninth embodiment of the present disclosure;

FIG. 41 depicts a table of aspherical data of a ninth embodiment of the optical imaging lens according to the present disclosure;

FIGS. 42A and 42B are tables for the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3), and AAG/T2 of the first to ninth example embodiments.

DETAILED DESCRIPTION

Figure 3:
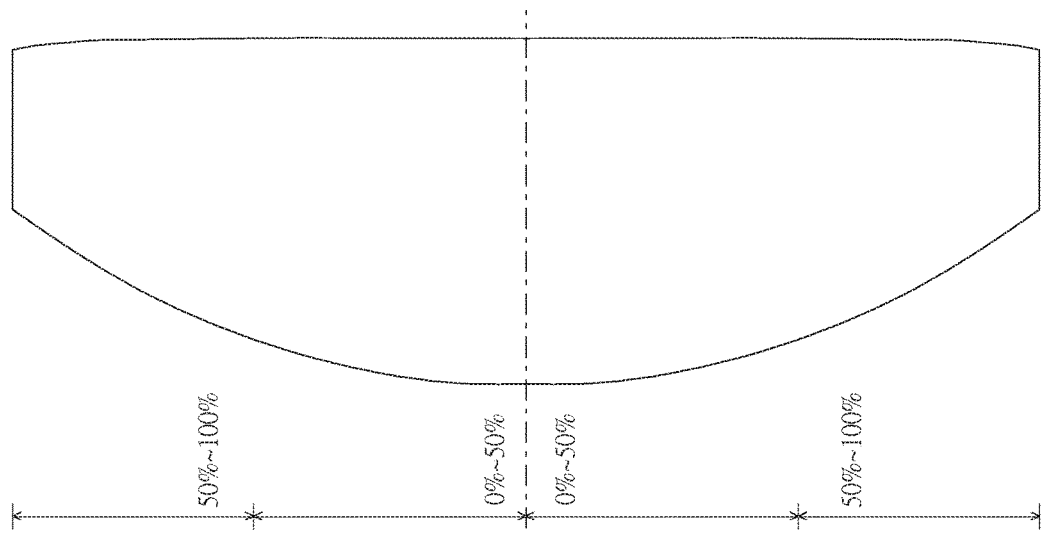
FIG. 3 depicts a schematic view of a first example of the surface shape and the effective radius of the lens element.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present disclosure, the description "a lens element having positive refracting power (or negative refracting power)" means that the paraxial refracting power of the lens element in Gaussian optics is positive (or negative). The description "An object-side (or image-side) surface of a lens element" may include a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element may be rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E may be used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 depicts a radial cross-sectional view of a lens element. Before determining boundaries of those aforesaid portions, two referential points should be defined first, the central point and the transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there may be other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point may have a convex shape, the portion located radially outside of the first transition point may have a concave shape, and the first transition point is the point where the portion having a convex shape changes to the portion having a concave shape, namely the border of two adjacent portions. Alternatively, there is another method to determine whether a portion in a vicinity of the optical axis may have a convex or concave shape by referring to the sign of an "R" value, which is the (paraxial) radius of curvature of a lens surface. The R value may be used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis may be defined as the portion between 0-50% of the effective radius (radius of the clear aperture) of the surface, whereas the portion in a vicinity of a periphery of the lens element may be defined as the portion between 50-100% of effective radius (radius of the clear aperture) of the surface.

Referring to the first example depicted in FIG. 3, only one transition point, namely a first transition point, appears within the clear aperture of the image-side surface of the lens element. Portion I may be a portion in a vicinity of the optical axis, and portion II may be a portion in a vicinity of a periphery of the lens element. The portion in a vicinity of the optical axis may be determined as having a concave surface due to the R value at the image-side surface of the lens element is positive. The shape of the portion in a vicinity of a periphery of the lens element may be different from that of the radially inner adjacent portion, i.e. the shape of the portion in a vicinity of a periphery of the lens element may be different from the shape of the portion in a vicinity of the optical axis; the portion in a vicinity of a periphery of the lens element may have a convex shape.

Figure 4:
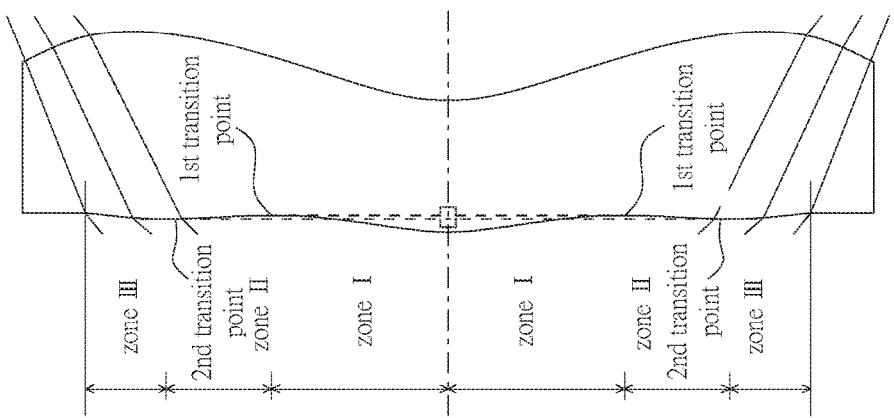
FIG. 4 depicts a schematic view of a second example of the surface shape and the effective radius of the lens element.

Referring to the second example depicted in FIG. 4, a first transition point and a second transition point may exist on the object-side surface (within the clear aperture) of a lens element. Here, portion I may be the portion in a vicinity of the optical axis, and portion III may be the portion in a vicinity of a periphery of the lens element. The portion in a vicinity of the optical axis may have a convex shape because the R value at the object-side surface of the lens element may be positive. The portion in a vicinity of a periphery of the lens element (portion III) may have a convex shape. What is more, there may be another portion having a concave shape existing between the first and second transition point (portion II).

Figure 5:
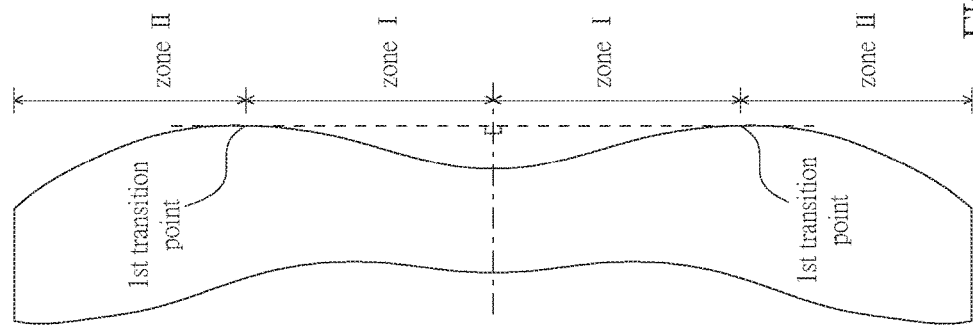
FIG. 5 depicts a schematic view of a third example of the surface shape and the effective radius of the lens element.

Referring to a third example depicted in FIG. 5, no transition point may exist on the object-side surface of the lens element. In this case, the portion between 0-50% of the effective radius (radius of the clear aperture) may be determined as the portion in a vicinity of the optical axis, and the portion between 50-100% of the effective radius may be determined as the portion in a vicinity of a periphery of the lens element. The portion in a vicinity of the optical axis of the object-side surface of the lens element may be determined as having a convex shape due to its positive R value, and the portion in a vicinity of a periphery of the lens element may be determined as having a convex shape as well.

In some embodiments, the optical imaging lens may further comprise an aperture stop positioned between the object and the first lens element, two adjacent lens elements or the fourth lens element and the image plane, such as glare stop or field stop, which may provide a reduction in stray light that is favorable for improving image quality.

In some embodiments, in the optical imaging lens of the present disclosure, the aperture stop can be positioned between the object and the first lens element as a front aperture stop or between the first lens element and the image plane as a middle aperture stop. If the aperture stop is the front aperture stop, a longer distance between the exit pupil of the optical imaging lens for imaging pickup and the image plane may provide the telecentric effect and may improve the efficiency of receiving images by the image sensor, which may comprise a CCD or CMOS image sensor. If the aperture stop is a middle aperture stop, the view angle of the optical imaging lens may be increased, such that the optical imaging lens for imaging pickup has the advantage of a wide-angle lens.

In the specification, parameters used herein may include:

| Parameter | Definition |
| --- | --- |
| T1 | The central thickness of the first lens element along the optical axis |
| G1 | The air gap between the first lens element and the second lens element along the optical axis |
| T2 | The central thickness of the second lens element along the optical axis |
| G2 | The air gap between the second lens element and the third lens element along the optical axis |
| T3 | The central thickness of the third lens element along the optical axis |
| G3 | The air gap between the third lens element and the fourth lens element along the optical axis |
| T4 | The central thickness of the fourth lens element along the optical axis |
| G4 | The air gap between the fourth lens element and the fifth lens element along the optical axis |
| T5 | The central thickness of the fifth lens element along the optical axis |
| G5 | The air gap between the fifth lens element and the sixth lens element along the optical axis |
| T6 | The central thickness of the sixth lens element along the optical axis |
| G6F | The air gap between the sixth lens element and the filtering unit along the optical axis |
| TF | The central thickness of the filtering unit along the optical axis |
| GFP | The air gap between the filtering unit and an image plane along the optical axis |
| f1 | The focusing length of the first lens element |
| f2 | The focusing length of the second lens element |
| f3 | The focusing length of the third lens element |
| f4 | The focusing length of the fourth lens element |
| f5 | The focusing length of the fifth lens element |
| f6 | The focusing length of the sixth lens element |
| n1 | The refracting index of the first lens element |
| n2 | The refracting index of the second lens element |
| n3 | The refracting index of the third lens element |
| n4 | The refracting index of the fourth lens element |
| n5 | The refracting index of the fifth lens element |
| n6 | The refracting index of the sixth lens element |
| v1 | The Abbe number of the first lens element |
| v2 | The Abbe number of the second lens element |
| v3 | The Abbe number of the third lens element |
| v4 | The Abbe number of the fourth lens element |
| v5 | The Abbe number of the fifth lens element |
| v6 | The Abbe number of the sixth lens element |
| HFOV | Half Field of View of the optical imaging lens |
| Fno | F-number of the optical imaging lens |
| EFL | The effective focal length of the optical imaging lens |
| TTL | The distance between the object-side surface of the first lens element and an image plane along the optical axis |

-continued

| Parameter | Definition |
| --- | --- |
| ALT | The sum of the central thicknesses of all lens elements |
| AAG | The sum of all air gaps between all lens elements along the optical axis |
| BFL | The back focal length of the optical imaging lens/The distance from the image-side surface of the last lens element to the image plane along the optical axis |
| Gmax | The maximum value of the air gaps between two adjacent lens elements of the first lens element to the sixth lens element |

In the present disclosure, various examples of optical imaging lenses are provided, including examples in which the optical imaging lens is a prime lens. Example embodiments of optical imaging lenses may comprise, sequentially from an object side to an image side along an optical axis, first, second, third, fourth, fifth and sixth lens elements, and a filtering unit, in which each of said lens elements has an object-side surface facing toward the object side and an image-side surface facing toward the image side. The optical imaging lens of the present disclosure achieves good optical characteristics and provides a shortened length due to the design characteristics of each lens element.

The optical imaging lens may include variations of any of the above mentioned characteristics, and the system including it may vary one or more lens elements. In addition, the system may include variations of additional optical features as well as variations of the optical lens length of the optical imaging lens. For example, the image-side surface of the first lens element comprising a concave portion in a vicinity of the optical axis may be favorable to gather light. The design of the first lens element combined with the object-side surface of the fourth lens element comprising a concave portion in a vicinity of a periphery of the fourth lens element may favorable to correct aberration. Further, the object-side surface of the sixth lens element comprising a concave portion in a vicinity of a periphery of the sixth lens element may effectively reduce the length of the optical lens, and enhance imaging quality and telephoto characteristics.

In addition, controlling the parameters of each lens element as described herein may beneficially provide a designer with the flexibility to design a technologically feasible optical imaging lens with good optical performance, shortened length, and enhanced telephoto characteristics.

For example, when the optical imaging lens could satisfy Equations (5), (13), (15) and (20), the length of the optical imaging lens may be in a proper value without reducing the camera ability for a distant object. The further restriction for Equations (5), (13), (15) and (20) may lead the optical imaging lens to have an effectively reduced length while improving the ability of the camera with respect to distant objects.

In some embodiments, the value of TTL/(T5+T6) may be further restricted between 4.30 and 8.50. In some embodiments, the value of TTL/(G3+G5) may be further restricted between 6.10 and 12.10. In some embodiments, the value of TTL/Gmax may be further restricted between 3.90 and 6.30. In some embodiments, the value of TTL/(T1+T3) may be further restricted between 4.60 and 8.20.

When the optical imaging lens could satisfy Equations (2), (3), (4), (7), (8), (9), (12), (14), (19) and (21), the relations between the thicknesses of the lens elements and the air gaps between the lens elements may be adjusted to improve technological feasibility as well as raise image quality. The further restriction for Equations (2), (3), (4), (7), (8), (9), (12), (14), (19) and (21) may lead the relations between the thicknesses of the lens elements and the air gaps between the lens elements may have appropriate values, preventing optical imaging lens parameters that are too large to allow the lens to be sufficiently thinned, and preventing optical imaging lens parameters that are small enough to interfere with assembly of the optical imaging lens.

In some embodiments, the value of ALT/Gmax may be further restricted between 1.70 and 2.30. In some embodiments, the value of T1/T3 may be further restricted between 2.10 and 4.10. In some embodiments, the value of ALT/(T4+T6) may be further restricted between 2.10 and 6.50. In some embodiments, the value of AAG/(G1+G3) may be further restricted between 3.40 and 6.50. In some embodiments, the value of ALT/(T2+T3) may be further restricted between 4.30 and 5.70. In some embodiments, the value of Gmax/T3 may be further restricted between 3.20 and 5.90. In some embodiments, the value of ALT/T2 may be further restricted between 8.60 and 11.20. In some embodiments, the value of AAG/(T1+T4) may be further restricted between 1.40 and 8.20. In some embodiments, the value of ALT/(G1+G4) may be further restricted between 1.70 and 6.80. In some embodiments, the value of AAG/T2 may be further restricted between 7.60 and 10.70.

When the optical imaging lens could satisfy Equations (1), (6), (10), (11), (16), (17) and (18), the relations between the thicknesses of the lens elements and the air gaps between the lens elements may have proper values, preventing optical imaging lens parameters that are too large to allow the lens to be sufficiently thinned, and preventing optical imaging lens parameters that are small enough to interfere with assembly of the optical imaging lens.

In some embodiments, the value of T1/(T3+T4) may be further restricted between 1.30 and 1.90. In some embodiments, the value of BFL/T3 may be further restricted between 1.80 and 9.90. In some embodiments, the value of TTL/T6 may be further restricted between 5.20 and 21.20. In some embodiments, the value of AAG/(G2+G4) may be further restricted between 1.10 and 1.70. In some embodiments, the value of ALT/(G2+G4) may be further restricted between 0.80 and 2.10. In some embodiments, the value of T1/T4 may be further restricted between 2.50 and 5.00. In some embodiments, the value of AAG/(T4+T6) may be further restricted between 1.60 and 4.70.

As a result of restricting various values as described above, the imaging quality of the optical imaging lens may be improved.

It should be appreciated that numerous variations are possible when considering improvements to the design of an optical system. When the optical imaging lens of the present disclosure satisfies at least one of the equations described above, the length of the optical lens may be reduced, the aperture stop may be enlarged (F-number may be reduced), the field angle may be reduced, the imaging quality may be enhanced, or the assembly yield may be upgraded. Such characteristics may advantageously mitigate various drawbacks in other optical system designs.

When implementing example embodiments, more details about the convex or concave surface could be incorporated for one specific lens element or broadly for plural lens elements to enhance control over system performance and/or resolution. It is noted that the details listed here could be incorporated in example embodiments if no inconsistency occurs.

Figure 6:
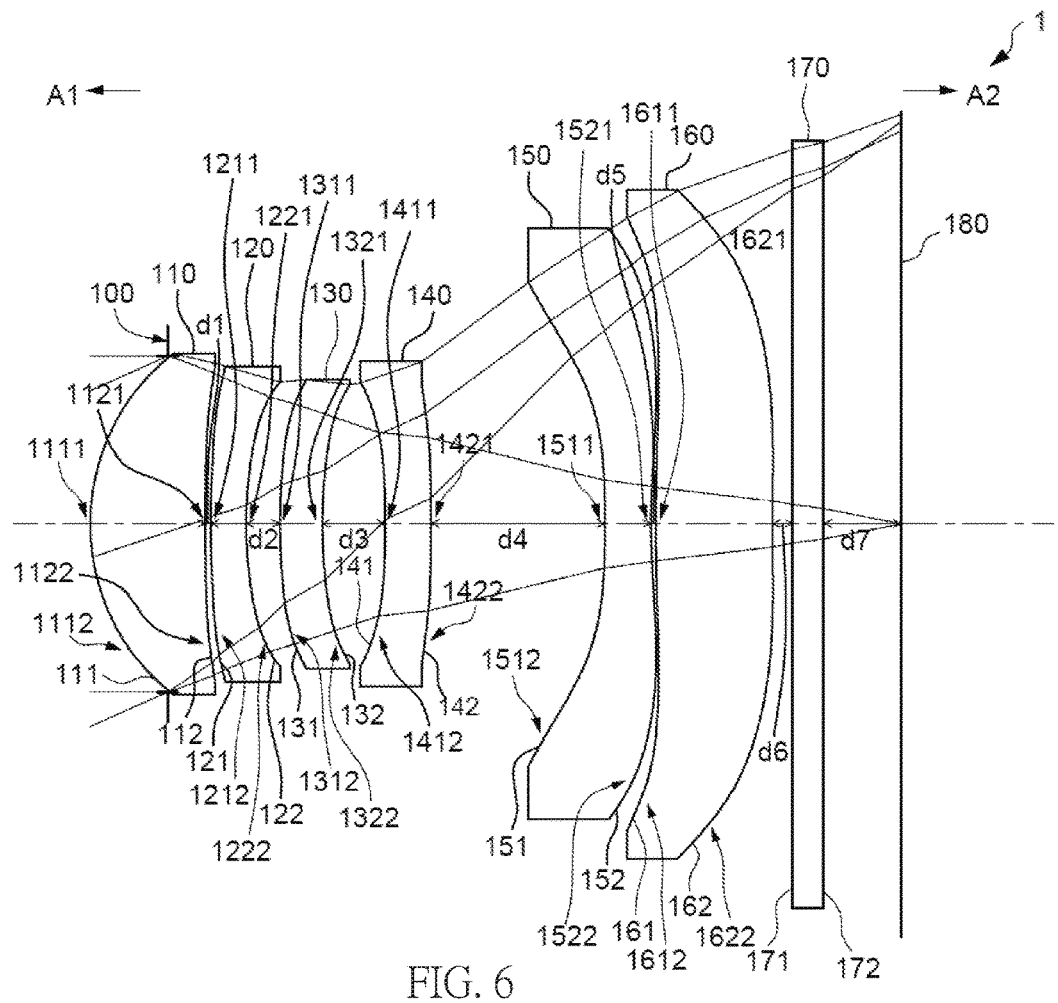
FIG. 6 depicts a cross-sectional view of a first embodiment of an optical imaging lens having six lens elements according to the present disclosure.
Figure 7:
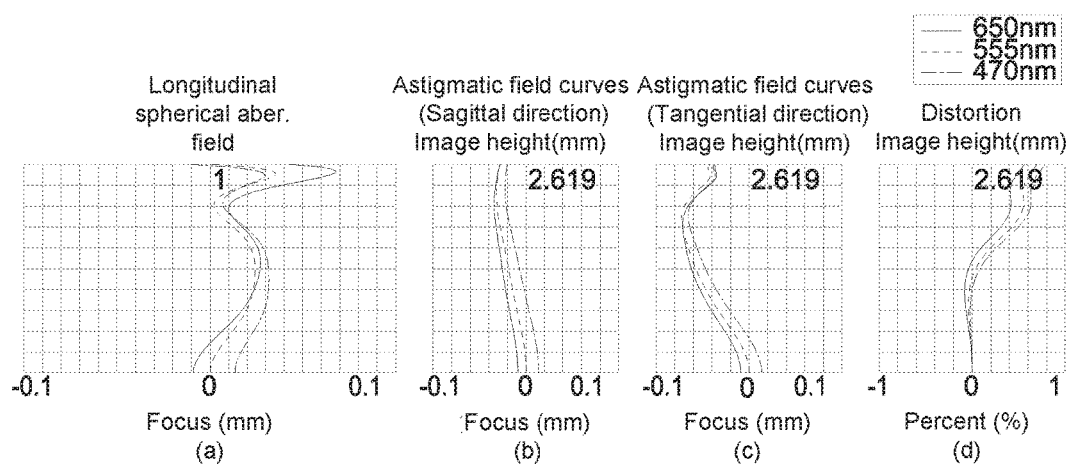
FIG. 7 depicts a chart of longitudinal spherical aberration and other kinds of optical aberrations of a first embodiment of the optical imaging lens according to the present disclosure.

Several exemplary embodiments and associated optical data will now be provided to illustrate non-limiting examples of optical imaging lens systems having good optical characteristics and a shortened length. Reference is now made to FIGS. 6-9. FIG. 6 illustrates an example cross-sectional view of an optical imaging lens 1 having six lens elements according to a first example embodiment. FIG. 7 shows example charts of longitudinal spherical aberration and other kinds of optical aberrations of the optical imaging lens 1 according to the first example embodiment. FIG. 8 illustrates an example table of optical data of each lens element of the optical imaging lens 1 according to the first example embodiment. FIG. 9 depicts an example table of aspherical data of the optical imaging lens 1 according to the first example embodiment.

As shown in FIG. 6, the optical imaging lens 1 of the present embodiment may comprise, in order from an object side A1 to an image side A2 along an optical axis, an aperture stop 100, a first lens element 110, a second lens element 120, a third lens element 130, a fourth lens element 140, a fifth lens element 150 and a sixth lens element 160. A filtering unit 170 and an image plane 180 of an image sensor (not shown) are positioned at the image side A2 of the optical imaging lens 1. Each of the first, second, third, fourth, fifth and sixth lens elements 110, 120, 130, 140, 150, 160 and the filtering unit 170 may comprise an object-side surface 111/121/131/141/151/161/171 facing toward the object side A1 and an image-side surface 112/122/132/142/152/162/172 facing toward the image side A2. The example embodiment of the filtering unit 170 illustrated is an IR cut filter (infrared cut filter) positioned between the sixth lens element 160 and an image plane 180. The filtering unit 170 selectively absorbs light passing optical imaging lens 1 that has a specific wavelength. For example, if IR light is absorbed, IR light which is not seen by human eyes is prohibited from producing an image on the image plane 180.

Exemplary embodiments of each lens element of the optical imaging lens 1 will now be described with reference to the drawings. The lens elements of the optical imaging lens 1 are constructed using plastic material, in some embodiments.

An example embodiment of the first lens element 110 may have positive refracting power. The object-side surface 111 may comprise a convex portion 1111 in a vicinity of an optical axis and a convex portion 1112 in a vicinity of a periphery of the first lens element 110. The image-side surface 112 may comprise a concave portion 1121 in a vicinity of the optical axis and a concave portion 1122 in a vicinity of a periphery of the first lens element 110. The object-side surface 111 and the image-side surface 112 may be aspherical surfaces.

An example embodiment of the second lens element 120 may have negative refracting power. The object-side surface 121 may comprise a convex portion 1211 in a vicinity of the optical axis and a convex portion 1212 in a vicinity of a periphery of the second lens element 120. The image-side surface 122 may comprise a concave portion 1221 in a vicinity of the optical axis and a concave portion 1222 in a vicinity of a periphery of the second lens element 120. The object-side surface 121 and the image-side surface 122 may be aspherical surfaces.

An example embodiment of the third lens element 130 may have negative refracting power. The object-side surface 131 may comprise a convex portion 1311 in a vicinity of the optical axis and a convex portion 1312 in a vicinity of a periphery of the third lens element 130. The image-side surface 132 may comprise a concave portion 1321 in a vicinity of the optical axis and a concave portion 1322 in a vicinity of a periphery of the third lens element 130. The object-side surface 131 and the image-side surface 132 may be aspherical surfaces.

An example embodiment of the fourth lens element 140 may have negative refracting power. The object-side surface 141 may comprise a concave portion 1411 in a vicinity of the optical axis and a concave portion 1412 in a vicinity of a periphery of the fourth lens element 140. The image-side surface 142 may comprise a convex portion 1421 in a vicinity of the optical axis and a convex portion 1422 in a vicinity of a periphery of the fourth lens element 140. The object-side surface 141 and the image-side surface 142 may be aspherical surfaces.

An example embodiment of the fifth lens element 150 may have negative refracting power. The object-side surface 151 may comprise a concave portion 1511 in a vicinity of the optical axis and a concave portion 1512 in a vicinity of a periphery of the fifth lens element 150. The image-side surface 152 may comprise a concave portion 1521 in a vicinity of the optical axis and a convex portion 1522 in a vicinity of a periphery of the fifth lens element 150. The object-side surface 151 and the image-side surface 152 may be aspherical surfaces.

An example embodiment of the sixth lens element 160 may have positive refracting power. The object-side surface 161 may comprise a convex portion 1611 in a vicinity of the optical axis and a concave portion 1612 in a vicinity of a periphery of the sixth lens element 160. The image-side surface 162 may comprise a concave portion 1621 in a vicinity of the optical axis and a convex portion 1622 in a vicinity of a periphery of the sixth lens element 160. The object-side surface 161 and the image-side surface 162 may be aspherical surfaces.

In example embodiments, air gaps exist between the lens elements 110, 120, 130, 140, 150, 160 the filtering unit 170 and the image plane 180 of the image sensor. For example, FIG. 6 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the sixth lens element 160, the air gap d6 existing between the sixth lens element 160 and the filtering unit 170, and the air gap d7 existing between the filtering unit 170 and the image plane 180 of the image sensor. However, in other embodiments, any of the aforesaid air gaps may or may not exist. For example, the profiles of opposite surfaces of any two adjacent lens elements may correspond to each other, and in such situation, the air gap may not exist. The air gap d1 is denoted by G1, the air gap d2 is denoted by G2, the air gap d3 is denoted by G3, the air gap d4 is denoted by G4, the air gap d5 is denoted by G5, the air gap d6 is denoted by G6F, the air gap d7 is denoted by GFP, and the sum of d1, d2, d3, d4 and d5 is denoted by AAG.

FIG. 8 depicts the optical characteristics of each lens elements in the optical imaging lens 1 of the present embodiment. The aspherical surfaces including the object-side surface 111 of the first lens element 110, the image-side surface 112 of the first lens element 110, the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160 are all defined by the following aspherical formula (1):

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \qquad \text{formula (1)}$$

wherein,

R represents the radius of curvature of the surface of the lens element;

Z represents the depth of the aspherical surface (the perpendicular distance between the point of the aspherical surface at a distance Y from the optical axis and the tangent plane of the vertex on the optical axis of the aspherical surface);

Y represents the perpendicular distance between the point of the aspherical surface and the optical axis;

K represents a conic constant;

$a_{2i}$ represents an aspherical coefficient of $2i^{th}$ level.

The values of each aspherical parameter are shown in FIG. 9.

FIG. 7(a) shows the longitudinal spherical aberration, wherein the horizontal axis of FIG. 7(a) defines the focus, and the vertical axis of FIG. 7(a) defines the field of view. FIG. 7(b) shows the astigmatism aberration in the sagittal direction, wherein the horizontal axis of FIG. 7(b) defines the focus, and the vertical axis of FIG. 7(b) defines the image height. FIG. 7(c) shows the astigmatism aberration in the tangential direction, wherein the horizontal axis of FIG. 7(c) defines the focus, and the vertical axis of FIG. 7(c) defines the image height. FIG. 7(d) shows the variation of the distortion aberration, wherein the horizontal axis of FIG. 7(d) defines the percentage, and the vertical axis of FIG. 7(d) defines the image height. The three curves with different wavelengths (470 nm, 555 nm, 650 nm) represent that off-axis light with respect to these wavelengths may be focused around an image point. From the vertical deviation of each curve shown in FIG. 7(a), the offset of the off-axis light relative to the image point may be within about ±0.07 mm. Therefore, the first embodiment may improve the longitudinal spherical aberration with respect to different wavelengths. Referring to FIG. 7(b), the focus variation with respect to the three different wavelengths (470 nm, 555 nm, 650 nm) in the whole field may fall within about ±0.04 mm. Referring to FIG. 7(c), the focus variation with respect to the three different wavelengths (470 nm, 555 nm, 650 nm) in the whole field may fall within about ±0.08 mm. Referring to FIG. 7(d), the horizontal axis of FIG. 7(d), the variation of the distortion aberration may be within about ±0.8%.

Please refer to FIG. 42A for the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3), and AAG/T2 of the present embodiment.

The distance from the object-side surface 111 of the first lens element 110 to the image plane 180 along the optical axis may be about 5.397 mm, EFL may be about 5.828 mm, HFOV may be about 24.051 degrees, the image height may be about 2.619 mm, and Fno may be about 2.609. In accordance with these values, the present embodiment may provide an optical imaging lens having a shortened length, and may be capable of accommodating a reduced product profile that also renders improved optical performance.

Figure 10:
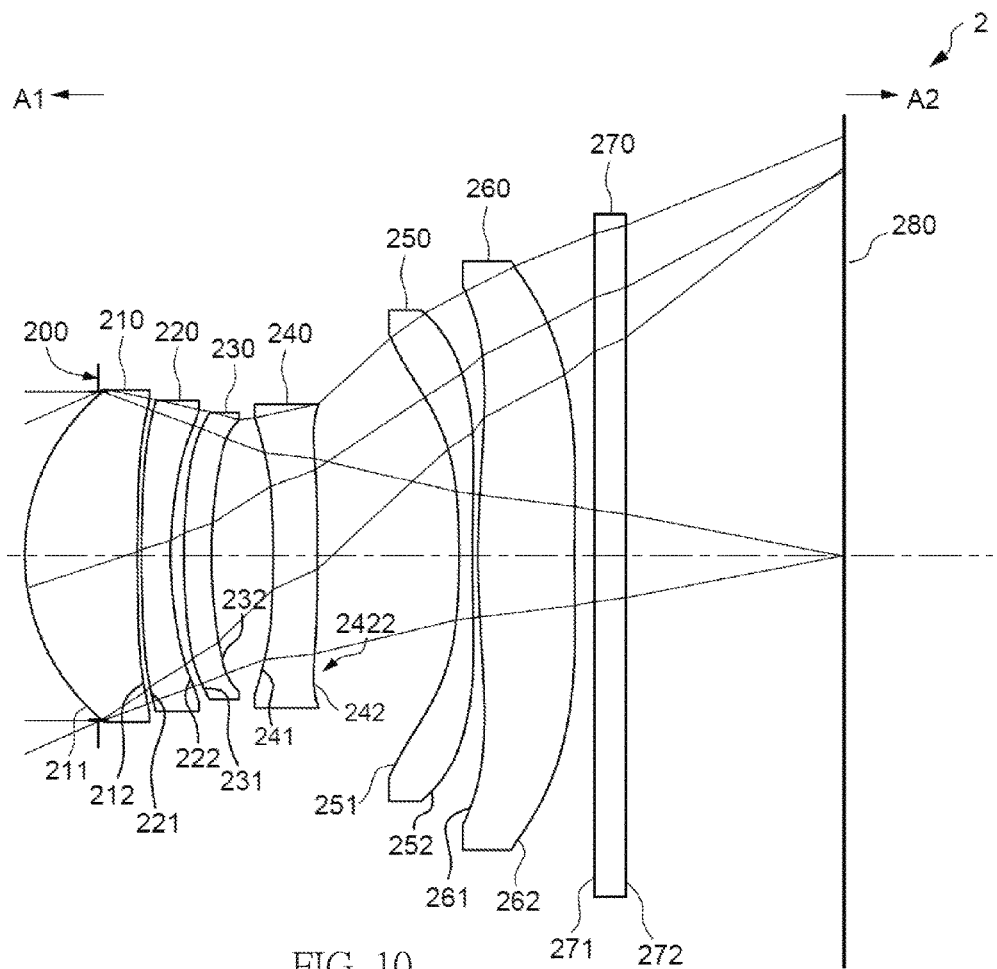
FIG. 10 depicts a cross-sectional view of a second embodiment of an optical imaging lens having six lens elements according to the present disclosure.
Figure 11:
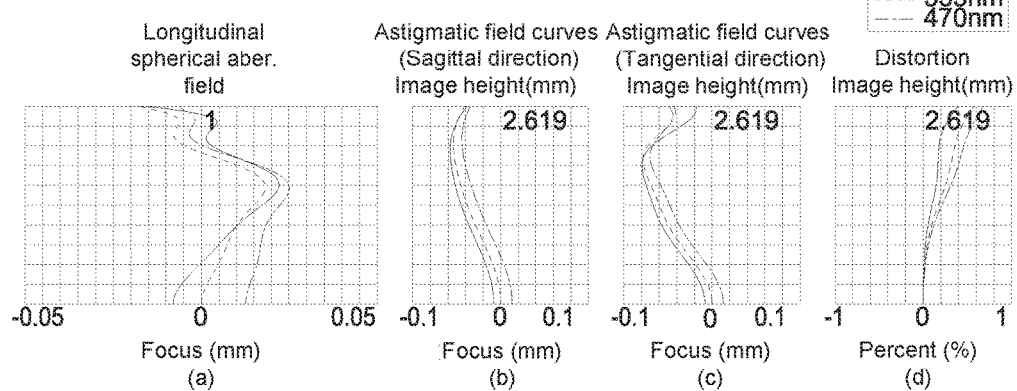
FIG. 11 depicts a chart of longitudinal spherical aberration and other kinds of optical aberrations of a second embodiment of the optical imaging lens according the present disclosure.

Reference is now made to FIGS. 10-13. FIG. 10 illustrates an example cross-sectional view of an optical imaging lens 2 having six lens elements according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise an aperture stop 200, a first lens element 210, a second lens element 220, a third lens element 230, a fourth lens element 240, a fifth lens element 250 and a sixth lens element 260.

The arrangement of the convex or concave surface structures, including the object-side surfaces 211, 221, 231, 241, 251, and 261 and the image-side surfaces 212, 222, 232, 252, and 262 are generally similar to the optical imaging lens 1. The differences between the optical imaging lens 1 and the optical imaging lens 2 may include the convex or concave surface structure of the image-side surface 242. Additional differences may include a radius of curvature, a thickness, an aspherical data, and an effective focal length of each lens element. More specifically, the image-side surface 242 may comprise a concave portion 2422 in a vicinity of a periphery of the fourth lens element 240.

Here, for clearly showing the drawings of the present embodiment, only the surface shapes which are different from that in the first embodiment are labeled. Please refer to FIG. 12 for the optical characteristics of each lens element in the optical imaging lens 2 of the present embodiment.

From the vertical deviation of each curve shown in FIG. 11(a), the offset of the off-axis light relative to the image point may be within about ±0.025 mm. Referring to FIG. 11(b), the focus variation with respect to the three different wavelengths (470 nm, 555 nm, 650 nm) in the whole field may fall within about ±0.06 mm. Referring to FIG. 11(c), the focus variation with respect to the three different wavelengths (470 nm, 555 nm, 650 nm) in the whole field may fall within about ±0.08 mm. Referring to FIG. 11(d), the variation of the distortion aberration of the optical imaging lens 2 may be within about ±0.7%.

Please refer to FIG. 42A for the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3), and AAG/T2 of the present embodiment.

In comparison with the first embodiment, the longitudinal spherical aberration, the distortion aberration, and HFOV in the second embodiment may be smaller. Further, the second embodiment may be manufactured more easily, have better imaging quality and the yield rate may be higher when compared to the first embodiment.

Figure 14:
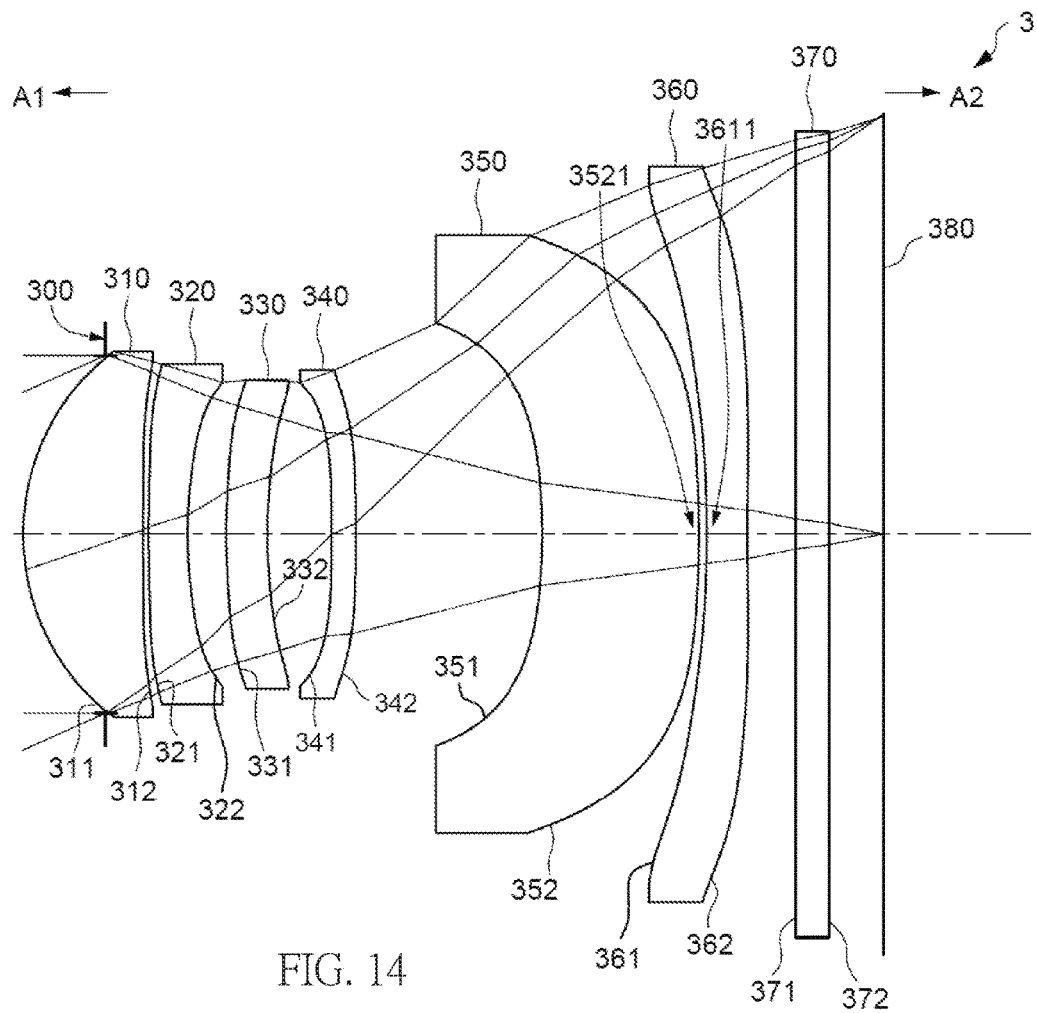
FIG. 14 depicts a cross-sectional view of a third embodiment of an optical imaging lens having six lens elements according to the present disclosure.
Figure 15:
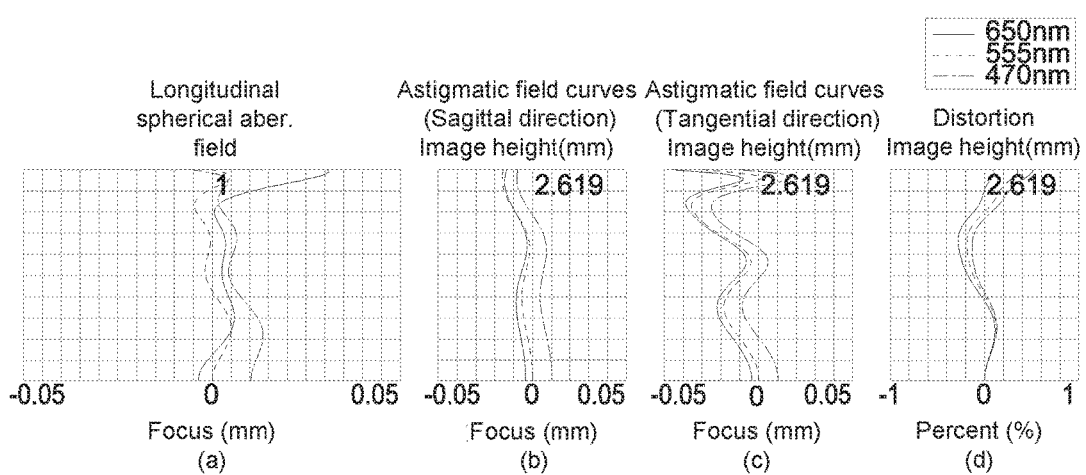
FIG. 15 depicts a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having six lens elements according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise an aperture stop 300, a first lens element 310, a second lens element 320, a third lens element 330, a fourth lens element 340, a fifth lens element 350 and a sixth lens element 360.

The arrangement of the convex or concave surface structures, including the object-side surfaces 311, 321, 331, 341, and 351 and the image-side surfaces 312, 322, 332, 342, and 362 are generally similar to the optical imaging lens 1. The differences between the optical imaging lens 1 and the optical imaging lens 3 may include the convex or concave surface structures of the image-side surface 352 and the object-side surface 361. Additional differences may include the refracting power of the sixth lens element 360, a radius of curvature, a thickness, aspherical data, and an effective focal length of each lens element. More specifically, the image-side surface 352 may comprise a convex portion 3521 in a vicinity of the optical axis, the object-side surface 361 may comprise a concave portion 3611 in a vicinity of the optical axis, and the sixth lens element 360 may have negative refracting power.

Here, for clearly showing the drawings of the present embodiment, only the surface shapes which are different from that in the first embodiment are labeled. Please refer to FIG. 16 for the optical characteristics of each lens element in the optical imaging lens 3 of the present embodiment.

From the vertical deviation of each curve shown in FIG. 15(a), the offset of the off-axis light relative to the image point may be within about ±0.035 mm. Referring to FIG. 15(b), the focus variation with respect to the three different wavelengths (470 nm, 555 nm, 650 nm) in the whole field may fall within about ±0.02 mm. Referring to FIG. 15(c), the focus variation with respect to the three different wavelengths (470 nm, 555 nm, 650 nm) in the whole field may fall within about ±0.05 mm. Referring to FIG. 15(d), the variation of the distortion aberration of the optical imaging lens 3 may be within about ±0.6%.

Please refer to FIG. 42A for the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3) and AAG/T2 of the present embodiment.

In comparison with the first embodiment, the the longitudinal spherical aberration, the astigmatism aberration in the sagittal and tangential directions, the distortion aberration, EFL, TTL and Fno of the third embodiment may be smaller. Furthermore, the third embodiment of the optical imaging lens may be manufactured more easily, have better imaging quality and the yield rate may be higher when compared to the first embodiment.

Figure 18:
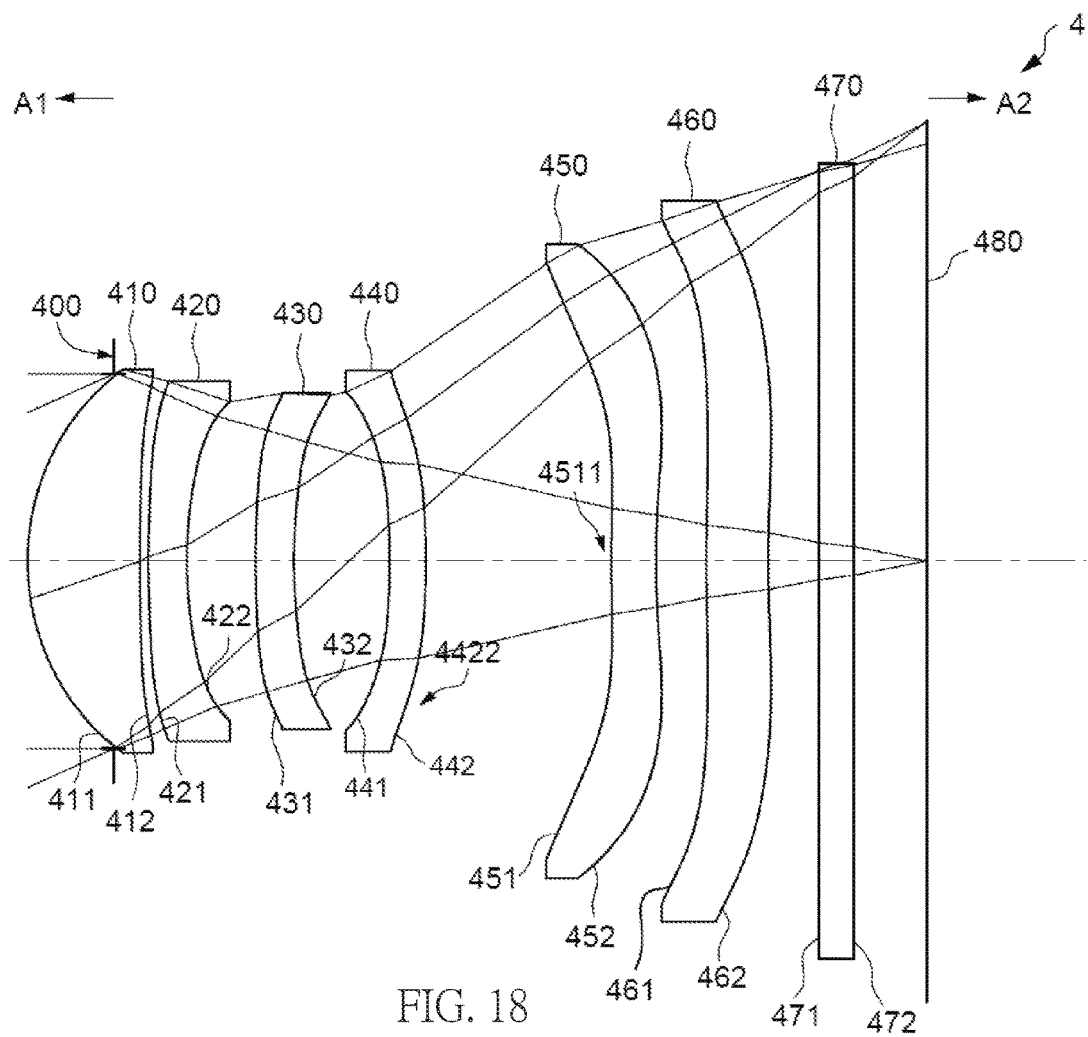
FIG. 18 depicts a cross-sectional view of a fourth embodiment of an optical imaging lens having six lens elements according to the present disclosure.
Figure 19:
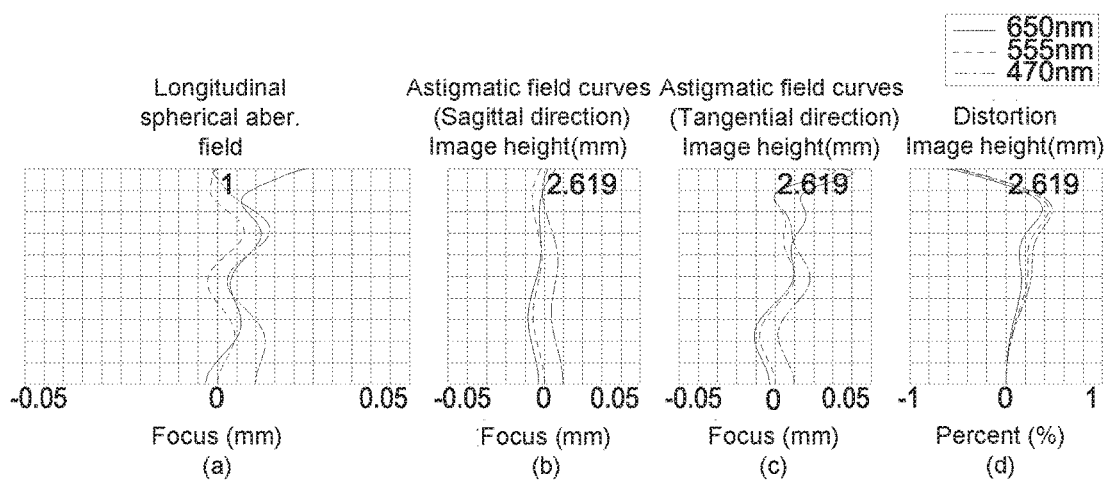
FIG. 19 depicts a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having six lens elements according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise an aperture stop 400, a first lens element 410, a second lens element 420, a third lens element 430, a fourth lens element 440, a fifth lens element 450 and a sixth lens element 460.

The arrangement of the convex or concave surface structures, including the object-side surfaces 411, 421, 431, 441, and 461 and the image-side surfaces 412, 422, 432, 442, 452, and 462 are generally similar to the optical imaging lens 1. The differences between the optical imaging lens 1 and the optical imaging lens 4 may include the convex or concave surface structure of the object-side surface 451. Additional differences may include the refracting power of the sixth lens element 460, a radius of curvature, a thickness, aspherical data, and an effective focal length of each lens element. More specifically, the object-side surface 451 may comprise a convex portion 4511 in a vicinity of the optical axis, and the sixth lens element 460 may have negative refracting power.

Here, for clearly showing the drawings of the present embodiment, only the surface shapes which are different from that in the first embodiment are labeled. Please refer to FIG. 20 for the optical characteristics of each lens elements in the optical imaging lens 4 of the present embodiment.

From the vertical deviation of each curve shown in FIG. 19(a), the offset of the off-axis light relative to the image point may be within about ±0.025 mm. Referring to FIG. 19(b), the focus variation with respect to the three different wavelengths (470 nm, 555 nm, 650 nm) in the whole field may fall within about ±0.01 mm. Referring to FIG. 19(c), the focus variation with respect to the three different wavelengths (470 nm, 555 nm, 650 nm) in the whole field may fall within about ±0.045 mm. Referring to FIG. 19(d), the variation of the distortion aberration of the optical imaging lens 4 may be within about ±0.65%.

Please refer to FIG. 42A for the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3) and AAG/T2 of the present embodiment.

In comparison with the first embodiment, the longitudinal spherical aberration, the astigmatism aberration in the sagittal and tangential directions, the distortion aberration, EFL, TTL, and Fno of the fourth embodiment may be smaller. Furthermore, the fourth embodiment of the optical imaging lens may be manufactured more easily, have better imaging quality and the yield rate may be higher when compared to the first embodiment.

Figure 22:
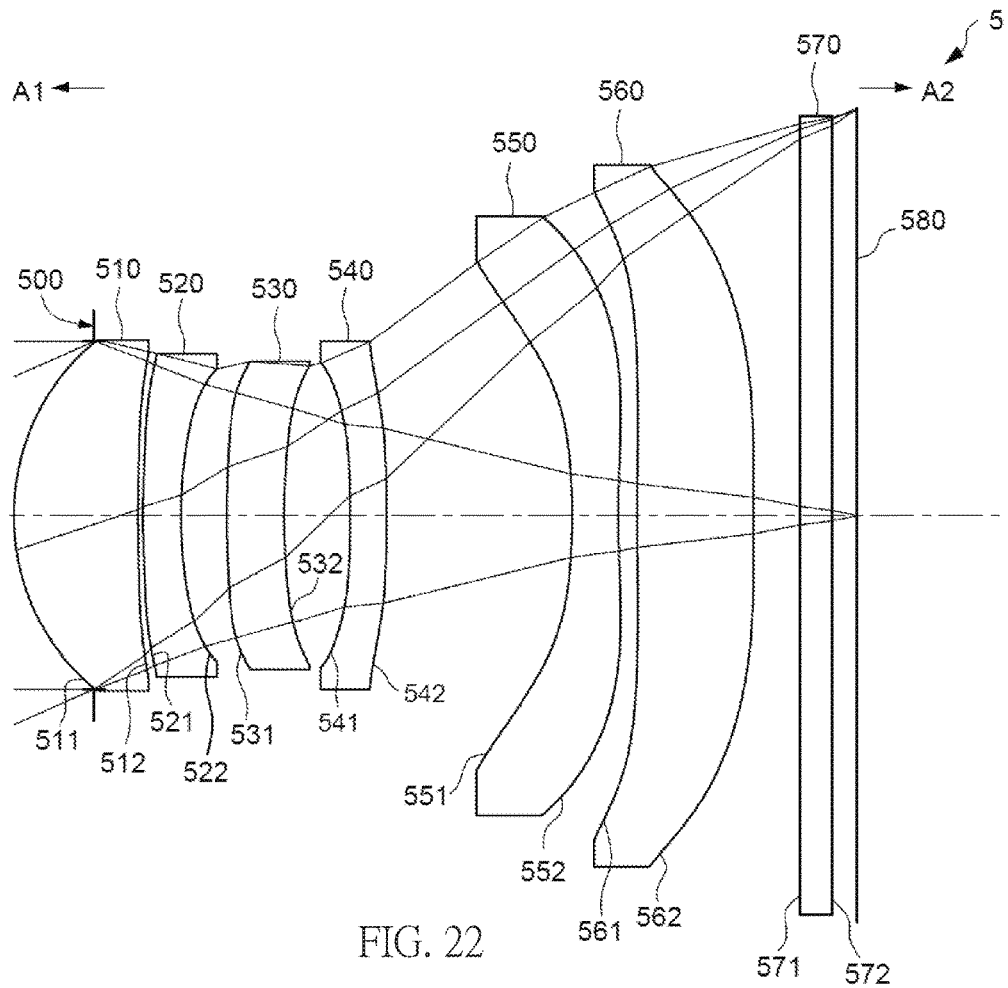
FIG. 22 depicts a cross-sectional view of a fifth embodiment of an optical imaging lens having six lens elements according to the present disclosure.
Figure 23:
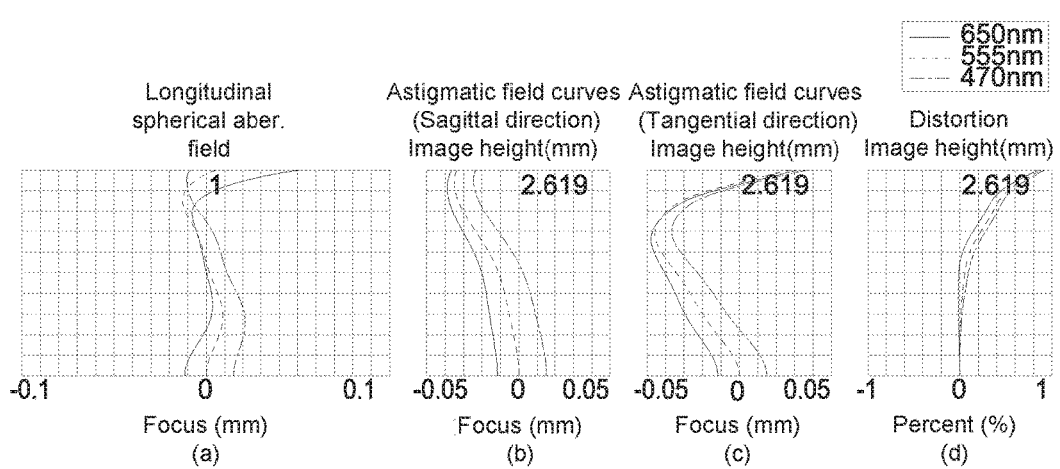
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having six lens elements according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise an aperture stop 500, a first lens element 510, a second lens element 520, a third lens element 530, a fourth lens element 540, a fifth lens element 550 and a sixth lens element 560.

The arrangement of the convex or concave surface structures, including the object-side surfaces 511, 521, 531, 541, 551, and 561 and the image-side surfaces 512, 522, 532, 542, 552, and 562 are generally similar to the optical imaging lens 1. The differences between the optical imaging lens 1 and the optical imaging lens 5 may include a radius of curvature, the thickness, aspherical data, and the effective focal length of each lens element.

Here, for clearly showing the drawings of the present embodiment, only the surface shapes which are different from that in the first embodiment are labeled. FIG. 24 depicts the optical characteristics of each lens elements in the optical imaging lens 5 of the present embodiment.

From the vertical deviation of each curve shown in FIG. 23(a), the offset of the off-axis light relative to the image point may be within about ±0.055 mm. Referring to FIG. 23(b), the focus variation with respect to the three different wavelengths (470 nm, 555 nm, 650 nm) in the whole field may fall within about ±0.04 mm. Referring to FIG. 23(c), the focus variation with respect to the three different wavelengths (470 nm, 555 nm, 650 nm) in the whole field may fall within about ±0.05 mm. Referring to FIG. 23(d), the variation of the distortion aberration of the optical imaging lens 5 may be within about ±0.95%.

Please refer to FIG. 42A for the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3) and AAG/T2 of the present embodiment.

In comparison with the first embodiment, the longitudinal spherical aberration, the astigmatism aberration in the tangential direction, and HFOV of the fifth embodiment may be smaller. Furthermore, the fifth embodiment of the optical imaging lens may be manufactured more easily, have better imaging quality and the yield rate may be higher when compared to the first embodiment.

Figure 26:
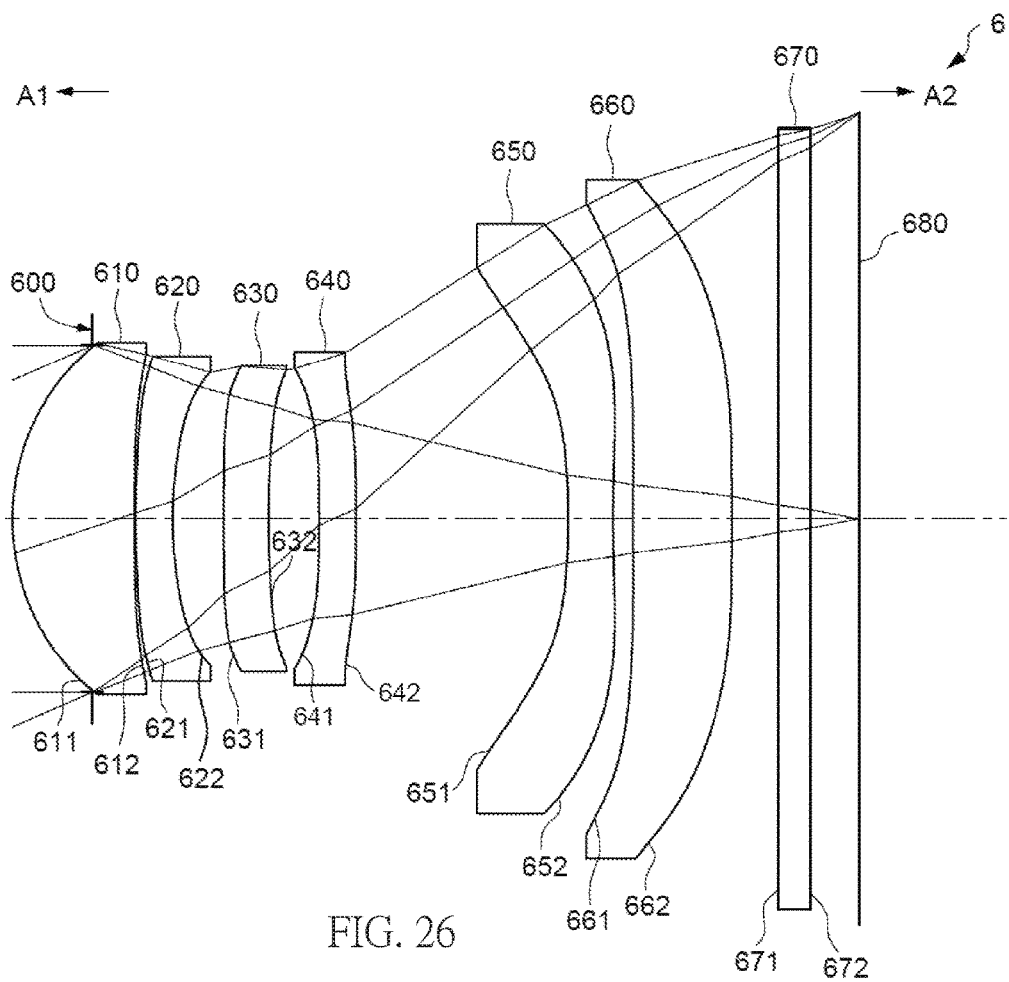
FIG. 26 depicts a cross-sectional view of a sixth embodiment of an optical imaging lens having six lens elements according to the present disclosure.
Figure 27:
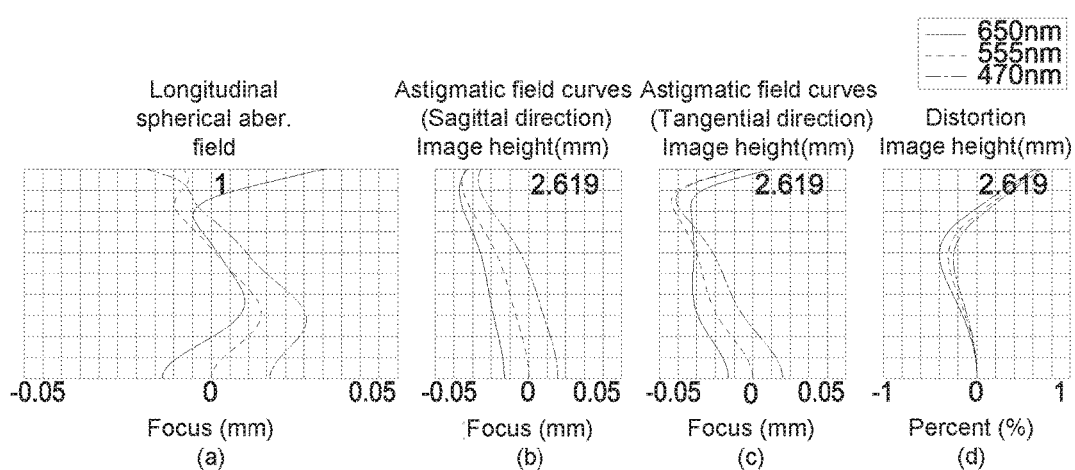
FIG. 27 depicts a chart of longitudinal spherical aberration and other kinds of optical aberrations of a sixth embodiment of the optical imaging lens according to the present disclosure.

Reference is now made to FIGS. 26-29. FIG. 26 illustrates an example cross-sectional view of an optical imaging lens 6 having six lens elements according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise an aperture stop 600, a first lens element 610, a second lens element 620, a third lens element 630, a fourth lens element 640, a fifth lens element 650 and a sixth lens element 660.

The arrangement of the convex or concave surface structures, including the object-side surfaces 611, 621, 631, 641, 651, and 661 and the image-side surfaces 612, 622, 632, 642, 652, and 662 are generally similar to the optical imaging lens 1. The differences between the optical imaging lens 1 and the optical imaging lens 6 may include the refracting power of the fourth lens element 640. Additional differences may include a radius of curvature, a thickness, aspherical data, and an effective focal length of each lens element. More specifically, the fourth lens element 640 may have positive refracting power.

Here, for clearly showing the drawings of the present embodiment, only the surface shapes which are different from that in the first embodiment are labeled. Please refer to FIG. 28 for the optical characteristics of each lens elements in the optical imaging lens 6 of the present embodiment.

From the vertical deviation of each curve shown in FIG. 27(a), the offset of the off-axis light relative to the image point may be within about ±0.035 mm. Referring to FIG. 27(b), the focus variation with respect to the three different wavelengths (470 nm, 555 nm, 650 nm) in the whole field may fall within about ±0.04 mm. Referring to FIG. 23(c), the focus variation with respect to the three different wavelengths (470 nm, 555 nm, 650 nm) in the whole field may fall within about ±0.045 mm. Referring to FIG. 27(d), the variation of the distortion aberration of the optical imaging lens 6 may be within about ±0.7%.

Please refer to FIG. 42B for the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3) and AAG/T2 of the present embodiment.

In comparison with the first embodiment, the longitudinal spherical aberration, the astigmatism aberration in the tangential direction, the distortion aberration, and HFOV of the sixth embodiment may be smaller. Furthermore, the sixth embodiment of the optical imaging lens may be manufactured more easily, have better imaging quality and the yield rate may be higher when compared to the first embodiment.

Figure 30:
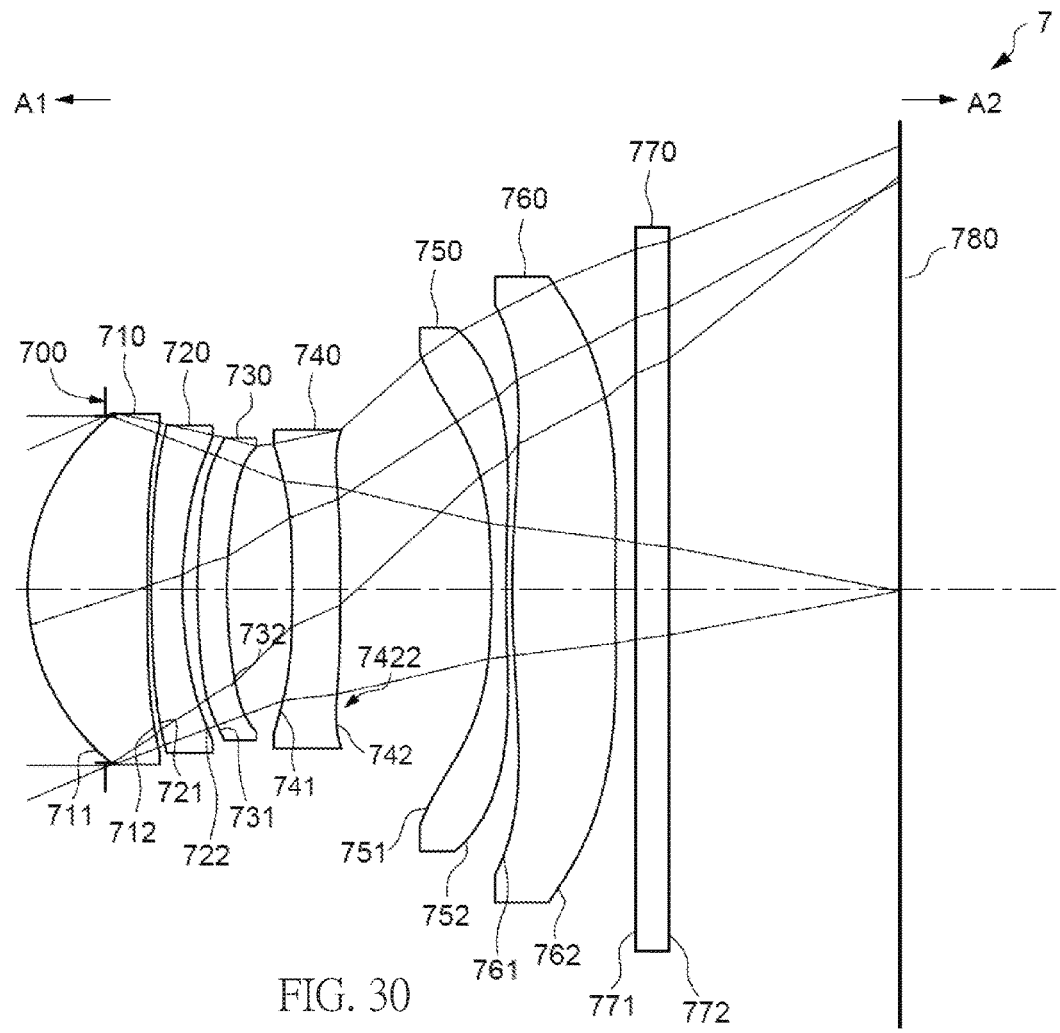
FIG. 30 depicts a cross-sectional view of a seventh embodiment of an optical imaging lens having six lens elements according to the present disclosure.
Figure 31:
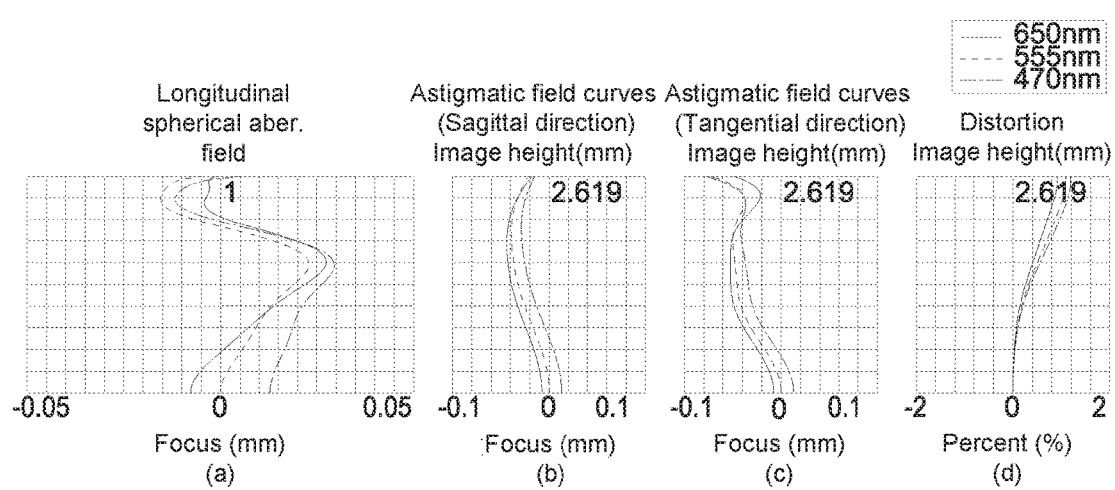
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having six lens elements according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise an aperture stop 700, a first lens element 710, a second lens element 720, a third lens element 730, fourth lens element 740, a fifth lens element 750 and a sixth lens element 760.

The arrangement of the convex or concave surface structures, including the object-side surfaces 711, 721, 731, 741, 751, and 761 and the image-side surfaces 712, 722, 732, 752, and 762 are generally similar to the optical imaging lens 1. The differences between the optical imaging lens 1 and the optical imaging lens 7 may include the convex or concave surface structure of the image-side surface 742. Additional differences may include a radius of curvature, a thickness, aspherical data, and an effective focal length of each lens element. More specifically, the image-side surface 742 may comprise a concave portion 7422 in a vicinity of a periphery of the fourth lens element 740

Here, for clearly showing the drawings of the present embodiment, only the surface shapes which are different from that in the first embodiment are labeled. Please refer to FIG. 32 for the optical characteristics of each lens elements in the optical imaging lens 7 of the present embodiment.

From the vertical deviation of each curve shown in FIG. 31(a), the offset of the off-axis light relative to the image point may be within ±0.03 mm. Referring to FIG. 31(b), the focus variation with respect to the three different wavelengths (470 nm, 555 nm, 650 nm) in the whole field falls within ±0.05 mm. Referring to FIG. 31(c), the focus variation with respect to the three different wavelengths (470 nm, 555 nm, 650 nm) in the whole field falls within ±0.08 mm. Referring to FIG. 31(d), the variation of the distortion aberration of the optical imaging lens 7 may be within ±1.2%.

Please refer to FIG. 42B for the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3) and AAG/T2 of the present embodiment.

In comparison with the first embodiment, the longitudinal spherical aberration and HFOV of the seventh embodiment may be smaller. Furthermore, the seventh embodiment of the optical imaging lens may be manufactured more easily, have better imaging quality and the yield rate may be higher when compared to the first embodiment.

Figure 34:
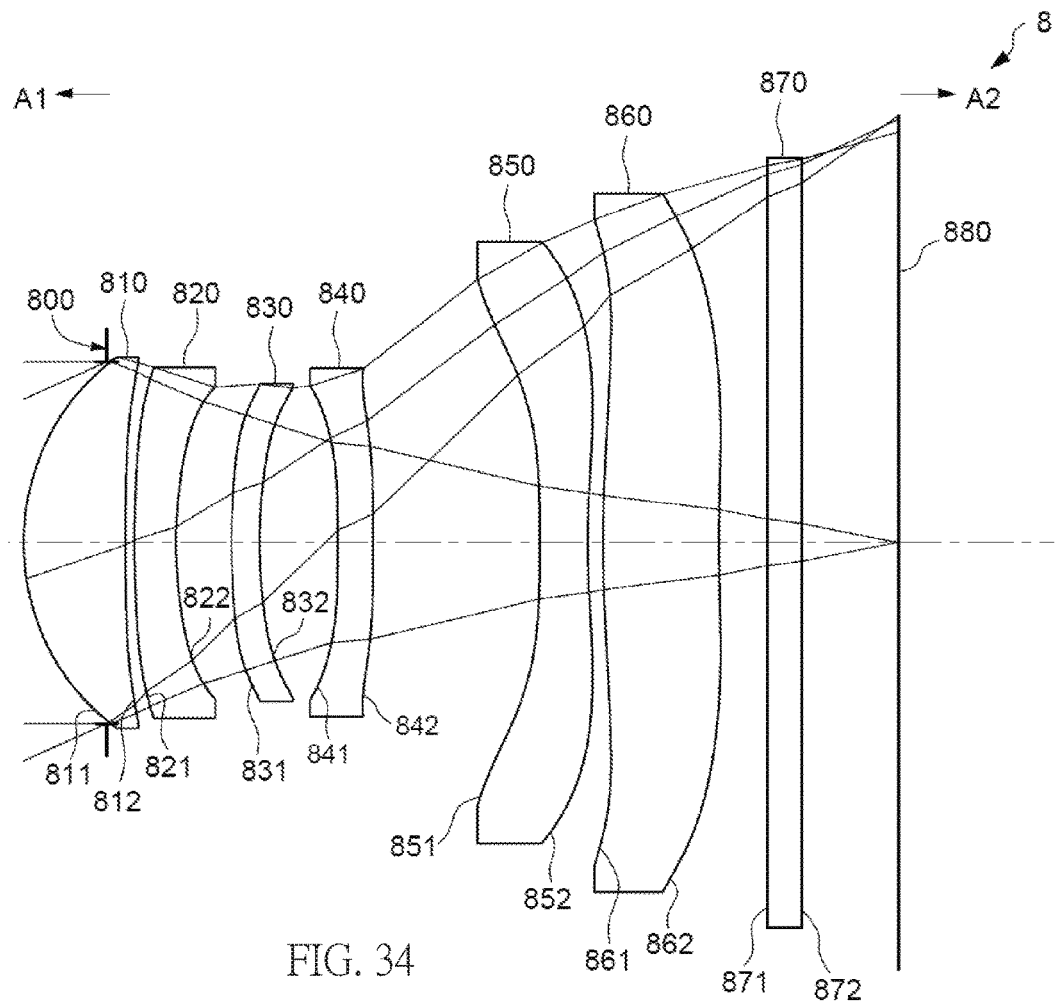
FIG. 34 depicts a cross-sectional view of an eighth embodiment of an optical imaging lens having six lens elements according to the present disclosure.
Figure 35:
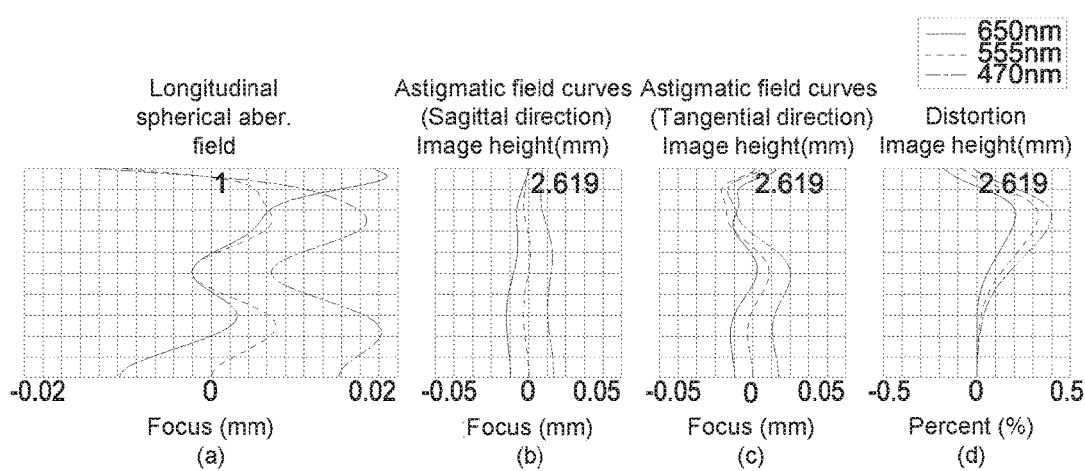
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having six lens elements according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise an aperture stop 800, a first lens element 810, a second lens element 820, a third lens element 830, a fourth lens element 840, a fifth lens element 850 and a sixth lens element 860.

The arrangement of the convex or concave surface structures, including the object-side surfaces 811, 821, 831, 841, 851, and 861 and the image-side surfaces 812, 822, 832, 842, 852, and 862 are generally similar to the optical imaging lens 1. The differences between the optical imaging lens 1 and the optical imaging lens 8 may include a radius of curvature, a thickness, aspherical data, and an effective focal length of each lens element.

Here, for clearly showing the drawings of the present embodiment, only the surface shapes which are different from that in the first embodiment are labeled. Please refer to FIG. 36 for the optical characteristics of each lens elements in the optical imaging lens 8 of the present embodiment.

From the vertical deviation of each curve shown in FIG. 35(a), the offset of the off-axis light relative to the image point may be within ±0.19 mm. Referring to FIG. 35(b), the focus variation with respect to the three different wavelengths (470 nm, 555 nm, 650 nm) in the whole field falls within ±0.015 mm. Referring to FIG. 35(c), the focus variation with respect to the three different wavelengths (470 nm, 555 nm, 650 nm) in the whole field falls within ±0.02 mm. Referring to FIG. 35(d), the variation of the distortion aberration of the optical imaging lens 8 may be within ±0.4%.

Please refer to FIG. 42B for the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3) and AAG/T2 of the present embodiment.

In comparison with the first embodiment, the astigmatism aberration in the sagittal and tangential directions, the distortion aberration, EFL and Fno of the eighth embodiment may be smaller. Further, the eighth embodiment of the optical imaging lens may be manufactured more easily, have better imaging quality and the yield rate may be higher when compared to the first embodiment.

Figure 38:
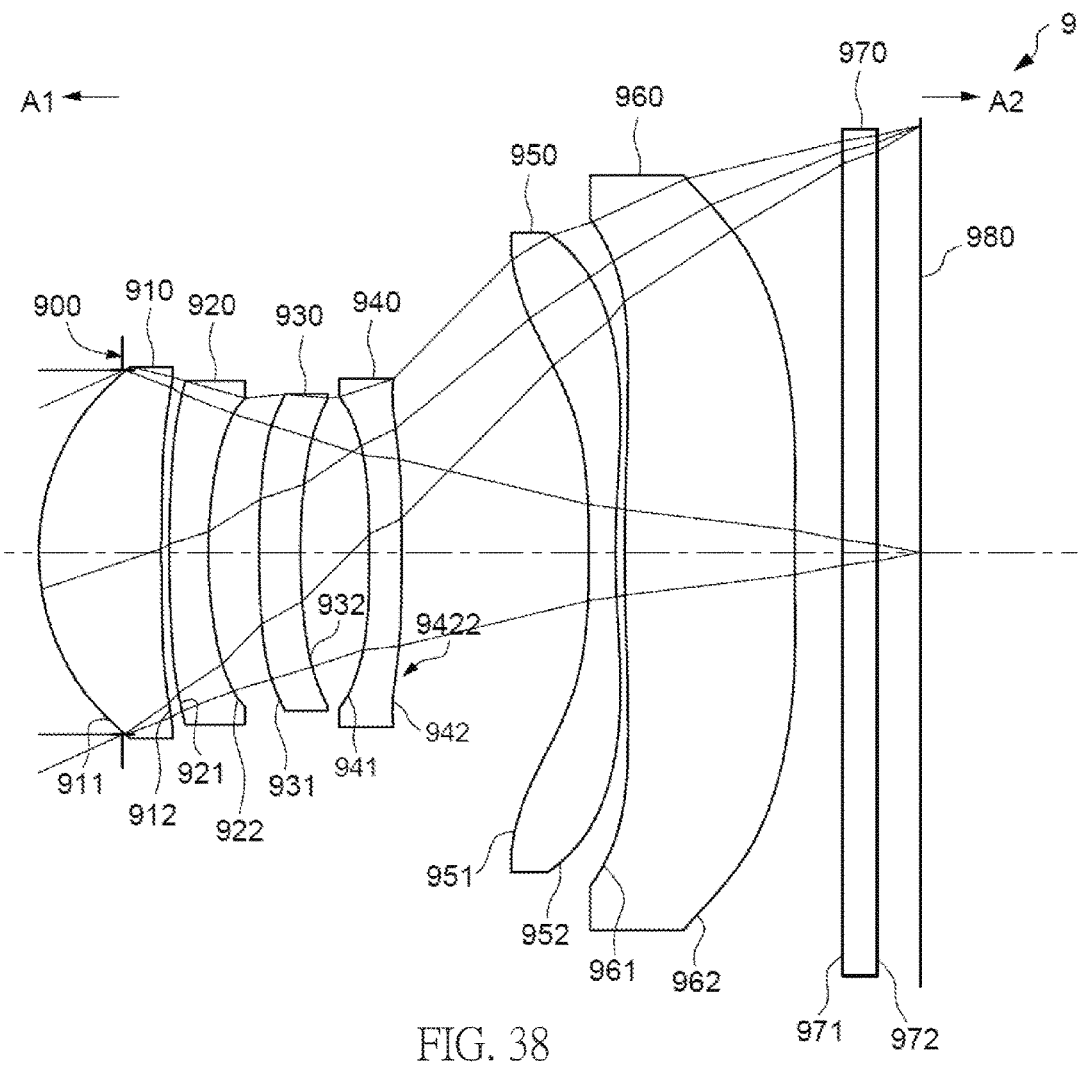
FIG. 38 depicts a cross-sectional view of a ninth embodiment of an optical imaging lens having six lens elements according to the present disclosure.
Figure 39:
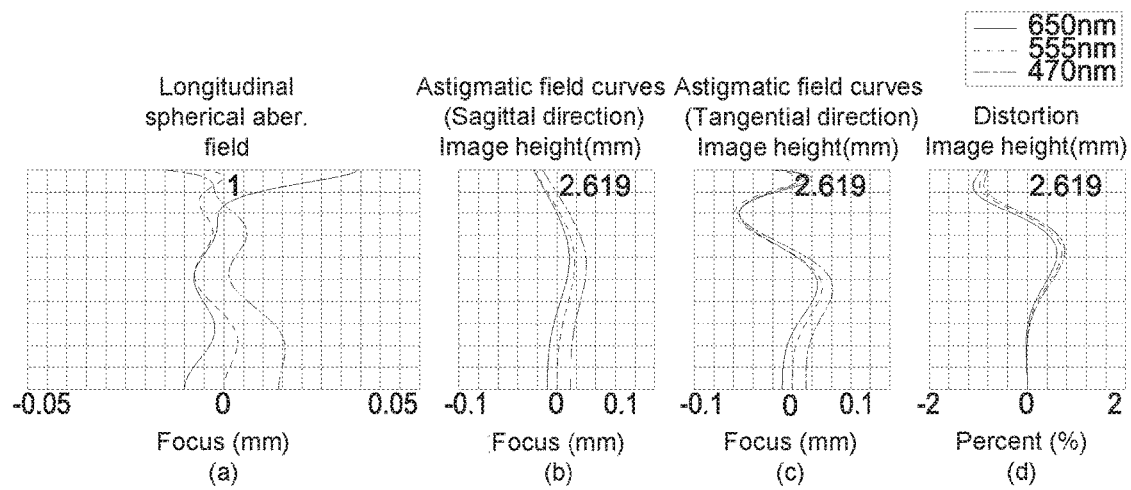
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having six lens elements according to a ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise an aperture stop 900, a first lens element 910, a second lens element 920, a third lens element 930, a fourth lens element 940, a fifth lens element 950 and a sixth lens element 960.

The arrangement of the convex or concave surface structures, including the object-side surfaces 911, 921, 931, 941, 951, and 961 and the image-side surfaces 912, 922, 932, 952, and 962 are generally similar to the optical imaging lens 1. The differences between the optical imaging lens 1 and the optical imaging lens 9 may include the convex or concave surface structure of the image-side surface 942. Additional differences may include a radius of curvature, a thickness, aspherical data, and an effective focal length of each lens element. More specifically, the image-side surface 942 may comprise a concave portion 9422 in a vicinity of a periphery of the fourth lens element 940.

Here, for clearly showing the drawings of the present embodiment, only the surface shapes which are different from that in the first embodiment are labeled. Please refer to FIG. 40 for the optical characteristics of each lens elements in the optical imaging lens 9 of the present embodiment.

From the vertical deviation of each curve shown in FIG. 39(a), the offset of the off-axis light relative to the image point may be within about ±0.035 mm. Referring to FIG. 39(b), the focus variation with respect to the three different wavelengths (470 nm, 555 nm, 650 nm) in the whole field falls within ±0.03 mm. Referring to FIG. 39(c), the focus variation with respect to the three different wavelengths (470 nm, 555 nm, 650 nm) in the whole field falls within ±0.06 mm. Referring to FIG. 39(d), the variation of the distortion aberration of the optical imaging lens 9 may be within ±1.2%.

Please refer to FIG. 42B for the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3) and AAG/T2 of the present embodiment.

In comparison with the first embodiment, the longitudinal spherical aberration, the astigmatism aberration in the sagittal and tangential directions, EFL and Fno of the ninth embodiment may be smaller. Further, the ninth embodiment of the optical imaging lens may be manufactured more easily, have better imaging quality and the yield rate may be higher when compared to the first embodiment.

Please refer to FIGS. 42A and 42B show the values of ALT, AAG, BFL, TTL, Gmax, T1/(T3+T4), ALT/Gmax, T1/T3, ALT/(T4+T6), TTL/(T5+T6), BFL/T3, AAG/(G1+G3), ALT/(T2+T3), Gmax/T3, TTL/T6, AAG/(G2+G4), ALT/T2, TTL/(G3+G5), AAG/(T1+T4), TTL/Gmax, ALT/(G2+G4), T1/T4, AAG/(T4+T6), ALT/(G1+G4), TTL/(T1+T3) and AAG/T2 of the first to ninth embodiments, and it is clear that the optical imaging lenses of the first to thirteenth embodiments may satisfy the Equations (1)-(21).

According to above disclosure, the longitudinal spherical aberration, the astigmatism aberration and the variation of the distortion aberration of each embodiment meet the use requirements of various electronic products which implement an optical imaging lens. Moreover, the off-axis light with respect to 470 nm, 555 nm and 650 nm wavelengths may be focused around an image point, and the offset of the off-axis light for each curve relative to the image point may be controlled to effectively inhibit the longitudinal spherical aberration, the astigmatism aberration and the variation of the distortion aberration. Further, as shown by the imaging quality data provided for each embodiment, the distance between the 470 nm, 555 nm and 650 nm wavelengths may indicate that focusing ability and inhibiting ability for dispersion is provided for different wavelengths.

According to above illustration, the optical imaging lens of the present disclosure may provide an effectively shortened optical imaging lens length while maintaining good optical characteristics, by controlling the structure of the lens elements as well as at least one of the inequalities described herein.

While various embodiments in accordance with the disclosed principles been described above, it should be understood that they are presented by way of example only, and are not limiting. Thus, the breadth and scope of exemplary embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, sequentially from an object side to an image side along an optical axis, comprising first, second, third, fourth, fifth and sixth lens elements, each of said first, second, third, fourth, fifth and sixth lens elements having refracting power, an object-side surface facing toward said object side and an image-side surface facing toward said image side, wherein:
said image-side surface of said first lens element comprises a concave portion in a vicinity of the optical axis;
the material of said second lens element is plastic;
the material of said third lens element is plastic;
said object-side surface of said fourth lens element comprises a concave portion in a vicinity of a periphery of said fourth lens element;
the material of said fifth lens element is plastic;
said object-side surface of said sixth lens element comprises a concave portion in a vicinity of a periphery of said sixth lens element;
said optical imaging lens comprises no other lenses having refracting power beyond said first, second, third, fourth, fifth and sixth lens elements;
a sum of the central thicknesses of all lens elements is represented by ALT, a maximum value of air gaps between two adjacent lens elements of said first lens element to said sixth lens element is represented by Gmax, a central thickness of said first lens element along the optical axis is represented by T1, a central thickness of said third lens element along the optical axis is represented by T3, a central thickness of said fourth lens element along the optical axis is represented by T4, and ALT, Gmax, T1, T3 and T4 satisfy the equations:

$1.3 \leq T1/(T3+T4)$ and $ALT/Gmax \leq 2.3$.

2. The optical imaging lens according to claim 1, wherein T1 and T3 satisfy the equation:

$T1/T3 \leq 4.10$.

3. The optical imaging lens according to claim 1, wherein a central thickness of said sixth lens element along the optical axis is represented by T6, and ALT, T4 and T6 satisfy the equation:

$ALT/(T4+T6) \leq 6.50$.

4. The optical imaging lens according to claim 1, wherein a distance between said object-side surface of said first lens element and an image plane along the optical axis is represented by TTL, a central thickness of said fifth lens element along the optical axis is represented by T5, a central thickness of said sixth lens element along the optical axis is represented by T6, and TTL, T5 and T6 satisfy the equation:

$TTL/(T5+T6) \leq 8.50$.

5. The optical imaging lens according to claim 1, wherein a back focal length of the optical imaging lens is represented by BFL, and BFL and T3 satisfy the equation:

$1.80 \leq BFL/T3$.

6. The optical imaging lens according to claim 1, wherein a sum of all air gaps between all lens elements along the optical axis is represented by AAG, an air gap between said first lens element and said second lens element along the optical axis is represented by G1, an air gap between said third lens element and said fourth lens element along the optical axis is represented by G3, and AAG, G1 and G3 satisfy the equation:

$AAG/(G1+G3) \leq 6.50$.

7. The optical imaging lens according to claim 1, wherein a central thickness of said second lens element along the optical axis is represented by T2, and ALT, T2 and T3 satisfy the equation:

$ALT/(T2+T3) \leq 5.70$.

8. The optical imaging lens according to claim 1, wherein Gmax and T3 satisfy the equation:

$Gmax/T3 \leq 5.90$.

9. The optical imaging lens according to claim 1, wherein a distance between said object-side surface of said first lens element and an image plane along the optical axis is represented by TTL, a central thickness of said sixth lens element along the optical axis is represented by T6, and TTL and T6 satisfy the equation:

$5.20 \leq TTL/T6$.

10. The optical imaging lens according to claim 1, wherein a sum of all air gaps between all lens elements along the optical axis is represented by AAG, an air gap between said second lens element and said third lens element along the optical axis is represented by G2, an air gap between said fourth lens element and said fifth lens element along the optical axis is represented by G4, and AAG, G2 and G4 satisfy the equation:

$$1.10 \leq AAG/(G2+G4).$$

11. The optical imaging lens according to claim 1, wherein a central thickness of said second lens element along the optical axis is represented by T2, and ALT and T2 satisfy the equation:

$$ALT/T2 \leq 11.20.$$

12. The optical imaging lens according to claim 1, wherein a distance between said object-side surface of said first lens element and an image plane along the optical axis is represented by TTL, an air gap between said third lens element and said fourth lens element along the optical axis is represented by G3, an air gap between said fifth lens element and said sixth lens element along the optical axis is represented by G5, and TTL, G3 and G5 satisfy the equation:

$$TTL/(G3+G5) \leq 12.10.$$

13. The optical imaging lens according to claim 1, wherein a sum of all air gaps between all lens elements along the optical axis is represented by AAG, and AAG, T1 and T4 satisfy the equation:

$$AAG/(T1+T4) \leq 8.20.$$

14. The optical imaging lens according to claim 1, wherein a distance between said object-side surface of said first lens element and an image plane along the optical axis is represented by TTL, and TTL and Gmax satisfy the equation:

$$TTL/Gmax \leq 6.30.$$

15. The optical imaging lens according to claim 1, wherein an air gap between said second lens element and said third lens element along the optical axis is represented by G2, an air gap between said fourth lens element and said fifth lens element along the optical axis is represented by G4, and ATL, G2 and G4 satisfy the equation:

$$0.80 \leq ALT/(G2+G4).$$

16. The optical imaging lens according to claim 1, wherein T1 and T4 satisfy the equation:

$$2.50 \leq T1/T4.$$

17. The optical imaging lens according to claim 1, wherein a sum of all air gaps between all lens elements along the optical axis is represented by AAG, a central thickness of said sixth lens element along the optical axis is represented by T6, and AAG, T4 and T6 satisfy the equation:

$$1.60 \leq AAG/(T4+T6).$$

18. The optical imaging lens according to claim 1, wherein an air gap between said first lens element and said second lens element along the optical axis is represented by G1, an air gap between said fourth lens element and said fifth lens element along the optical axis is represented by G4, and ALT, G1 and G4 satisfy the equation:

$$ALT/(G1+G4) \leq 6.80.$$

19. The optical imaging lens according to claim 1, wherein a distance between said object-side surface of said first lens element and an image plane along the optical axis is represented by TTL, and TTL, T1 and T3 satisfy the equation:

$$TTL/(T1+T3) \leq 8.20.$$

20. The optical imaging lens according to claim 1, wherein a sum of all air gaps between all lens elements along the optical axis is represented by AAG, and AAG and T2 satisfy the equation:

$$AAG/T2 \leq 10.70.$$

* * * * *